(12) United States Patent
Christy et al.

(10) Patent No.: US 7,970,704 B2
(45) Date of Patent: Jun. 28, 2011

(54) WIRELESS ADVISOR SUPPORT AND DATA INTEGRATION SYSTEM

(75) Inventors: Todd Christy, Southboro, MA (US); Thom Neff, Stowe, MA (US)

(73) Assignee: Pyxis Mobile, Inc., Waltham, MA (US)

( * ) Notice: Subject to any disclaimer, the term of this patent is extended or adjusted under 35 U.S.C. 154(b) by 242 days.

(21) Appl. No.: 11/636,420

(22) Filed: Dec. 8, 2006

(65) Prior Publication Data

US 2008/0139179 A1 Jun. 12, 2008

(51) Int. Cl.
*G06Q 40/00* (2006.01)
(52) U.S. Cl. ........... 705/42; 705/35; 705/39; 705/40; 705/37
(58) Field of Classification Search .......... 705/37
See application file for complete search history.

(56) References Cited

U.S. PATENT DOCUMENTS

| | | | |
|---|---|---|---|
| 2002/0027524 A1* | 3/2002 | Pippin | 342/357.08 |
| 2002/0095362 A1* | 7/2002 | Masand et al. | 705/35 |
| 2007/0057763 A1* | 3/2007 | Blattner et al. | 340/5.52 |
| 2008/0010196 A1* | 1/2008 | Rackley, III et al. | 705/40 |

* cited by examiner

*Primary Examiner* — Jagdish N Patel
*Assistant Examiner* — Kevin Poe
(74) *Attorney, Agent, or Firm* — Kristofer E. Elbing

(57) ABSTRACT

In one general aspect, a financial advisor support method is disclosed that includes presenting on a wireless handheld device a list of accounts of different types held by a household entity at different institutions, receiving through the wireless handheld device account selection commands for a selected account in the list presented in the step of presenting, and presenting on the wireless handheld device account information for the selected account in response to the step of receiving.

8 Claims, 27 Drawing Sheets

Portfolios (11) — 70

| Account | Market Value | Gain/Loss |
|---|---|---|
| Debt1 | $456,747,466 | △31270.31 |
| PORT_EQ1 | $22,376,913 | ▽-599.91 |
| PORT_EQ2 | $26,878,311 | △1863.37 |
| PORT_EQ3 | $13,135,881 | ▽-5197.10 |
| PORT_EQ4 | $54,396,354 | △2738.94 |
| PORT_EQ5 | $23,326,311 | ▽-3665.71 |

View: My Portfolios    Find: Acct

FIG. 3

Quote (1) — 80

Search By: Name    Value: ebay

Name: EBAY INC

Last Trade: 114.75
Bid: 117.62
Ask: 117.76
Change: ▽-1.45
Open: 117.64
1yr Target: 119.11
52wk: 81.23 - 162.66
Volume: 1147500.00

FIG. 4

View Positions (43) - PORT_EQ1 — 90
View: Positions  Find:

| Symbol | Last Prc | Qty | Gain/Loṣ |
|---|---|---|---|
| AA | ▽9.55 | 49,650 | -765.03 |
| AVP | △38.4 | 11,900 | 2045.73 |
| VZ | ▽33 | 7,900 | -2770.80 |
| DD | ▽42.5 | 17,000 | -217.18 |
| GE | △29.87 | 25,400 | 2022.07 |
| GM | ▽38.62 | 8,550 | -163.93 |

FIG. 5

Households (56) — 100
Find: Household

| Household | Tot Mkt Val | Tot Sec Val |
|---|---|---|
| Beard Family | $10,975,335 | $8,788,258 |
| Miller Family Trust | $10,944,588 | $8,755,750 |
| Hawkins Family Trust | $10,895,765 | $8,716,612 |
| Charren Family | $10,872,571 | $8,698,057 |
| Santiago Family | $10,754,355 | $8,603,484 |
| Knight Family Trust | $10,547,857 | $8,438,286 |

FIG. 6 mPlatform Administration Console (mPAC)

File | Help

- server: database
  - Users
  - Application Configuration
  - System Configuration
  - System Reports
  - Logging
  - MDM Configuration
    - Batch Info
    - Data Sources
    - mWholesaler
    - mInstitutional
    - mReports
    - mPortfolio

| Entity | MaxRows | DataSet | Sources Config | Mapping Config | Access | Description |
|---|---|---|---|---|---|---|
| Branch | 200 | | | | Batched | Branch |
| BranchContact | 200 | | | | Batched | Branch Activity |
| BranchReps | 200 | | | | Batched | Branch Reps |
| BranchSales | 200 | | | | Batched | Branch Sales |
| CodeDecode | 200 | | | | Batched | Code Decode |
| Dashboard | 200 | | | | Mixed | Dashboard |
| Firm | 200 | | | | Batched | Firm |
| FirmSales | 200 | | | | Batched | Firm Sales |
| Rep | 200 | | | | Mixed | Rep |
| RepContact | 200 | | | | Batched | Rep Activity |
| Report | 200 | 91450b-ebfc... | | | Mixed | Rep |
| Report | 200 | 24546CAA-CE... | | | Mixed | Rep Activity |
| Report | 200 | F10772BA-38... | | | Batched | Report |
| Report | 200 | 97C0F230-7D... | | | Mixed | Report |
| Report | 200 | DF0331B4-91... | | | Batched | Report |
| Report | 200 | Total Sales by... | | | | Report |
| Report | 200 | Big Tix Data... | | | Batched | Report |
| Report | 200 | C-1-DATA 3E... | | | Mixed | Report |
| Report | 200 | 58BACB08-37... | | | Batched | Report |
| Report | 200 | F3D97F8D-49... | | | | Report |
| Report | 200 | DF9CAB05-AB... | | | | Report |
| Report | 200 | 45404CF2-85... | | | | Report |
| Report | 200 | E07B5933-26... | | | | Report |
| Report | 200 | 91B319FA-29... | | | | Report |

[ Add DataSet ]  [ Edit ]  [ Delete ]   352 records

FIG. 12

WIRELESS ADVISOR SUPPORT AND DATA INTEGRATION SYSTEM

FIELD OF THE INVENTION

This invention relates to the collection of disparate data from varied physical sources and presentation via wireless devices to support financial advisors.

BACKGROUND OF THE INVENTION

Financial advisors serve their clients by providing a wide array of counsel related to investment planning, money management, and other financial advice. Advisors typically use a variety of systems and manual processes to track and manage their clients, accounts, schedules, transactions, portfolios, holdings, and other key aspects of their work. These tools can generally provide the advisor with the detailed client information and history through desktop computing resources. Some of these systems have been made available on wireless devices. But these offerings do not appear to have been adopted on a widespread basis.

SUMMARY OF THE INVENTION

In one general aspect, the invention features a financial advisor support method that includes presenting on a wireless handheld device a list of accounts of different types held by a household entity at different institutions, receiving through the wireless handheld device account selection commands for a selected account in the list presented in the step of presenting, and presenting on the wireless handheld device account information for the selected account in response to the step of receiving.

In preferred embodiments, the step of presenting a list of accounts can present a list that includes account information from the different types of accounts. The account information presented in the step of presenting a list of accounts can be presented in real-time. The account information presented in the step of presenting account information can be presented in real-time. At least some of the accounts can be personal accounts held by a member of the household entity with some of the accounts being fiduciary accounts held for the household entity by third parties. At least some of the accounts can belong to different members of the household. The method can further include the steps of presenting on a wireless handheld device a list of household entities, receiving through the wireless handheld device household entity selection commands for a selected household entity in the list of household entities presented in the step of presenting a list of household entities, and with the step of presenting a list of accounts presenting a list of accounts for the selected household entity. Members of the household can be linked by civil family relationships.

Systems according to the invention can be particularly advantageous in that they can efficiently and effectively permit an individual to work remotely, and retrieve critical data in real time without the constraints of physical network connections or desktop computing resources. Such systems also allow for the presentation of complex and disparate data on small screens provided by wireless computing devices. These capabilities are particularly important to financial advisors, as the demands of their role and their customers result in increasing amounts of time away from their primary office, and increasingly complex sources and forms of real-time data. Combinations of convenient access, real-time retrieval and update, disparate data access, and/or screen design optimized for wireless devices can offer a compelling set of functionality for financial advisors. This functionality can help advisors to spend more time in person with their clients and prospects, know them better, and assist them better through the use of real-time, convenient access to the data required to conduct their daily business.

BRIEF DESCRIPTION OF THE DRAWINGS

FIG. 3 is a screen view of a portfolio screen for a wireless device that can connect to the wireless advisor support system data integration network of FIG. 1;

FIG. 4 is a screen view of a quote screen for a wireless device that can connect to the wireless advisor support system data integration network of FIG. 1;

FIG. 5 is a screen view of a position screen for a wireless device that can connect to the wireless advisor support system data integration network of FIG. 1;

FIG. 6 is a screen view of a household list screen for a wireless device that can connect to the wireless advisor support system data integration network of FIG. 1;

FIG. 12 is a screen shot of the console window of FIG. 10, showing a wireless data integration engine entity list;

DETAILED DESCRIPTION OF AN ILLUSTRATIVE EMBODIMENT

Figure 1:
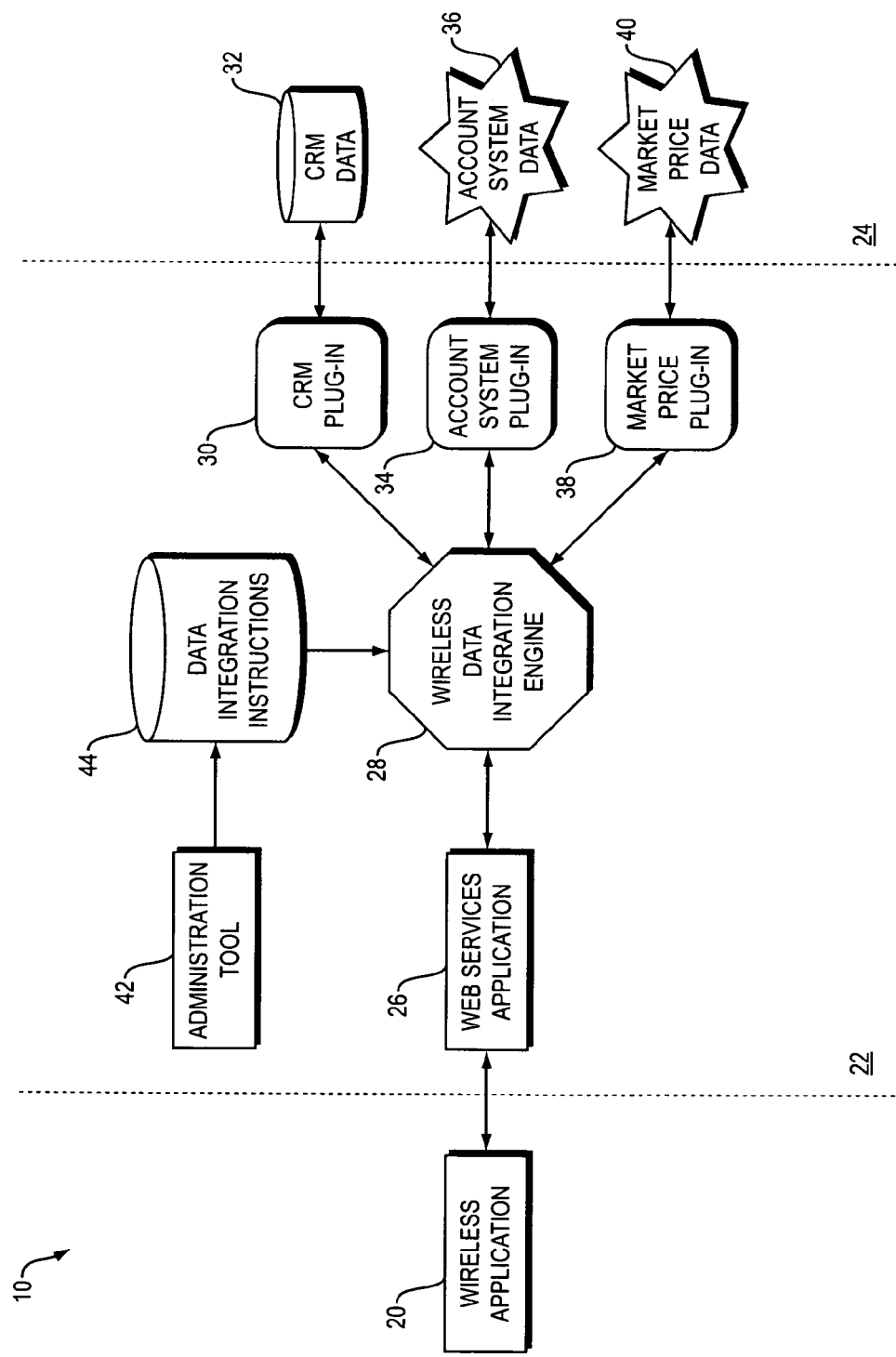
FIG. 1 is a block diagram of a wireless advisor support system data integration network according to the invention.

Referring to FIG. 1, an illustrative wireless advisor support system data integration network 10 enables financial advisors associated with a hosting organization to access data from multiple heterogeneous data sources and view them in real time on a single screen on a mobile computer. Calculated columns and Data Driven Formatting (DDF) can be optionally performed on data joined together from multiple sources to enhance the data's value to a financial advisor.

The network 10 can include one or more wireless applications 20 that can each run on a mobile device. These applications interface with a data integration server 22 through a web services interface 26 at its front end. The data integration server interfaces with a number of information provider services 24 through its back end.

Figure 2:
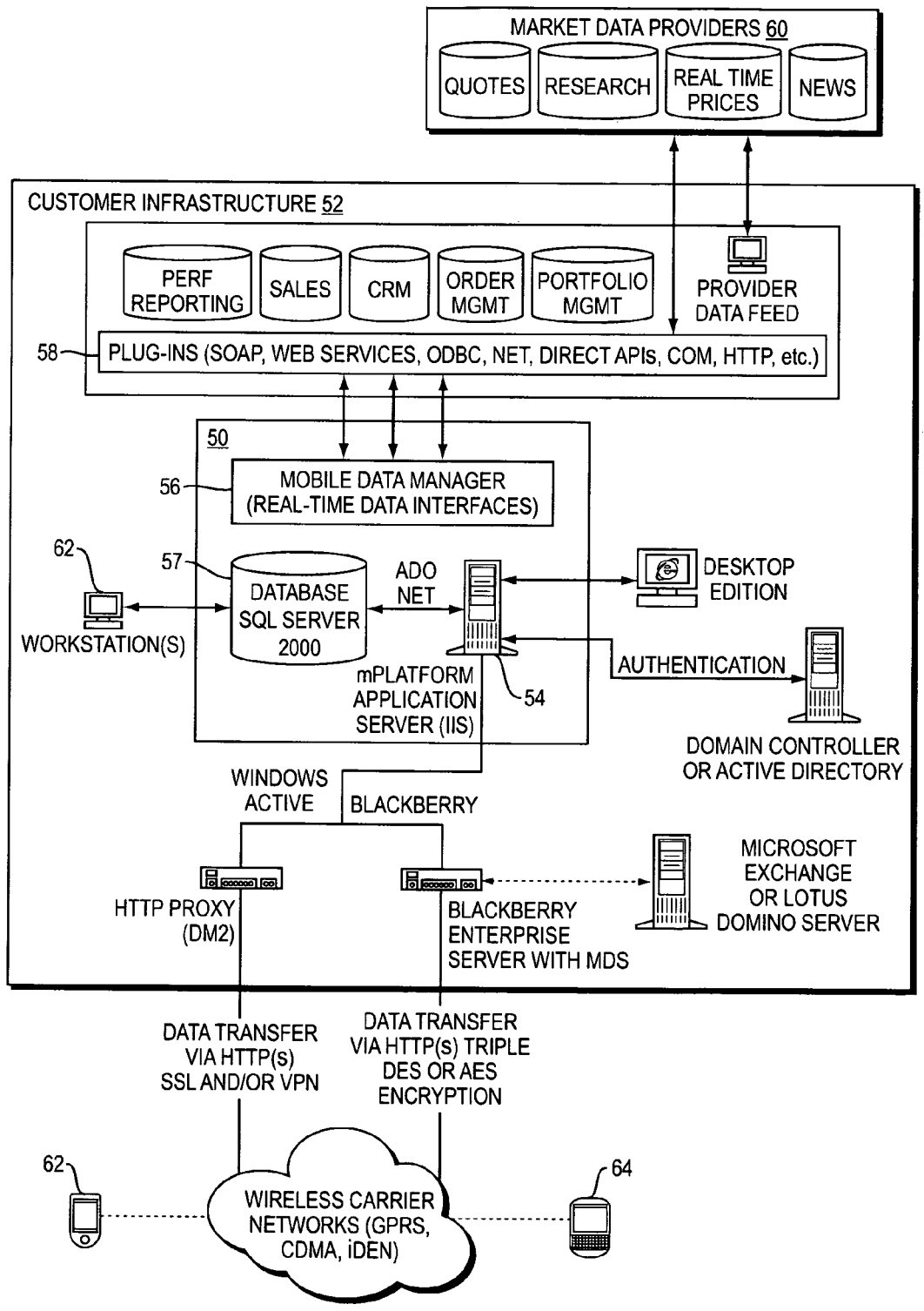
FIG. 2 is a more detailed block diagram showing data storage relationships for the wireless advisor support system data integration network of FIG. 1.

Referring also to FIG. 2, the network can be implemented as a platform module 50 that includes a mobile data management module 56, a server database 57, and an application server 54. The application server can communicate via one or more protocols with one or more wireless network carrier networks (e.g., GPRS, CDMA, iDEN). In the illustrative embodiment, the application server communicates through an HTTP proxy via HTTP, HTTPS, and/or VPN for Windows Mobile® devices 66. And it communicates through a Blackberry® enterprise server via HTTP, HTTPS, DES, or AES encryption for Blackberry devices 64.

The platform module 50 is capable of interacting with a number of back-end plug-ins 58 that allow it to access data stored in different formats from different services, using different protocols. These plug-ins can be designed to interface with a hosting organization's local records, such as performance reporting records, sales, Customer Relationship Management (CRM), order management, and portfolio management. They can also be designed to interface with external data providers, such as providers of quotes, research, prices, and news.

Referring also to FIGS. 3-5, the wireless application 20 can provide a variety of views specifically tailored to assisting financial advisors, such as a portfolio list view 70, a quote view 80, and a positions view 90. The list view allows the advisor end-user to view information for a client's account in a columnar layout. This layout can include an account column 72, a market value column 74, and a gain/loss column 78. Other types of columns could also be provided.

The quote view 80 can show a variety of information labels 84 and values 86 for an individual product such as a stock or bond. The fields shown can be user-selected, and can be for values such as trade price, bid price, asking price, price change, opening price, 1 year target, 52 wk range, and volume. The view positions view 90 can show columns for ticker symbol 94, last price 96, quantity, and gain and loss 98 for positions for a group of products. As discussed in more detail below, the data presented in the list, quote, and positions views can be derived in real-time from a variety of different information feeds through the server's back-end plug-in interface and formatted with DDF. The system can also be configured to allow many other types of views to be provided.

Figure 7:
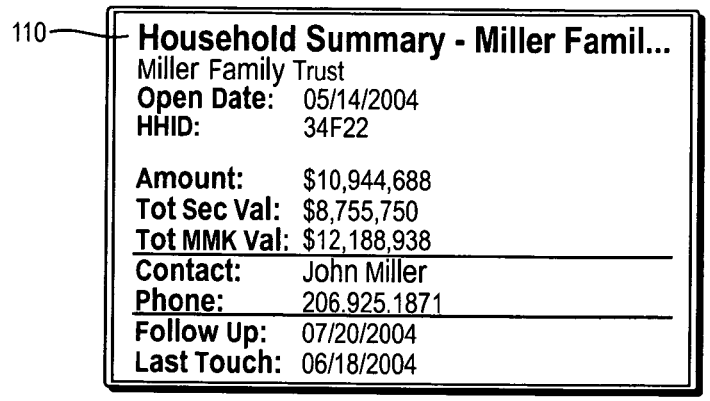
FIG. 7 is a screen view of a household summary screen for a wireless device that can connect to the wireless advisor support system data integration network of FIG. 1.
Figure 8:
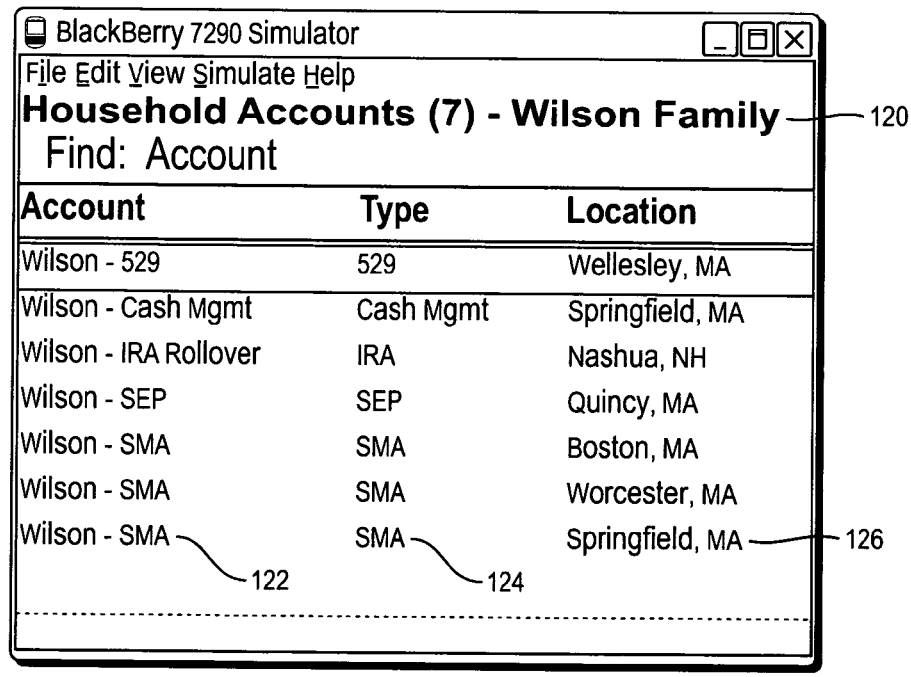
FIG. 8 is a screen view of a household account screen for a wireless device that can connect to the wireless advisor support system data integration network of FIG. 1.

Referring to FIGS. 6-8, the wireless application can also provide views that support household data access functions, which can be particularly powerful for financial-advisors. These views can include a household list view, a household find view, a household summary view, a household account list view, and a household accounts view. Other suitable types of views can also be set up to use the household concept.

Referring to FIG. 6, a find household view 100 or a household list view can provide a list of all households that the advisor handles. These types of views can include columns of household names 102 and columns of market values 104, securities held 106, or other quantities. As can other views, these views can include data that is derived from combinations of different data sources in real-time and can be conditionally formatted.

Referring also to FIG. 7, selecting "enter," such as by clicking on a household entry in a list on the wireless device, can bring the advisor to a household summary view 110. This and other views can also be accessed through a context-sensitive menu. Possible entries on this menu can include entries to access the household summary view, the household accounts list view, and a household position list view, and household contact list view.

Referring to FIG. 8, the household account list view or find view 120 can include columns for account names 122, account types 124, and locations 126 for the accounts. Other account attributes can also be provided for. The household position view can include some of these columns as well as one or more position columns for the accounts. As can other views, this type of view can include data that is derived from combinations of different data sources in real-time and can be conditionally formatted, allowing the advisor to get an accurate picture of a complex set of holdings in real time, rather than just viewing a collection of raw data.

Accounts or households can also be selected in such a way as to bring up contact information lists. These lists can include contact information columns, such as for telephone, e-mail, address, and roles of individuals associated with an account or a household. The role column can list a variety of role types, such as holder, trustee, or fiduciary. The user can then select contacts to reach views that show which accounts an individual is associated with, such as in the case of an attorney that handles multiple trust accounts. These individuals can also be members of households, independent of their professional involvement with accounts.

Figure 9:
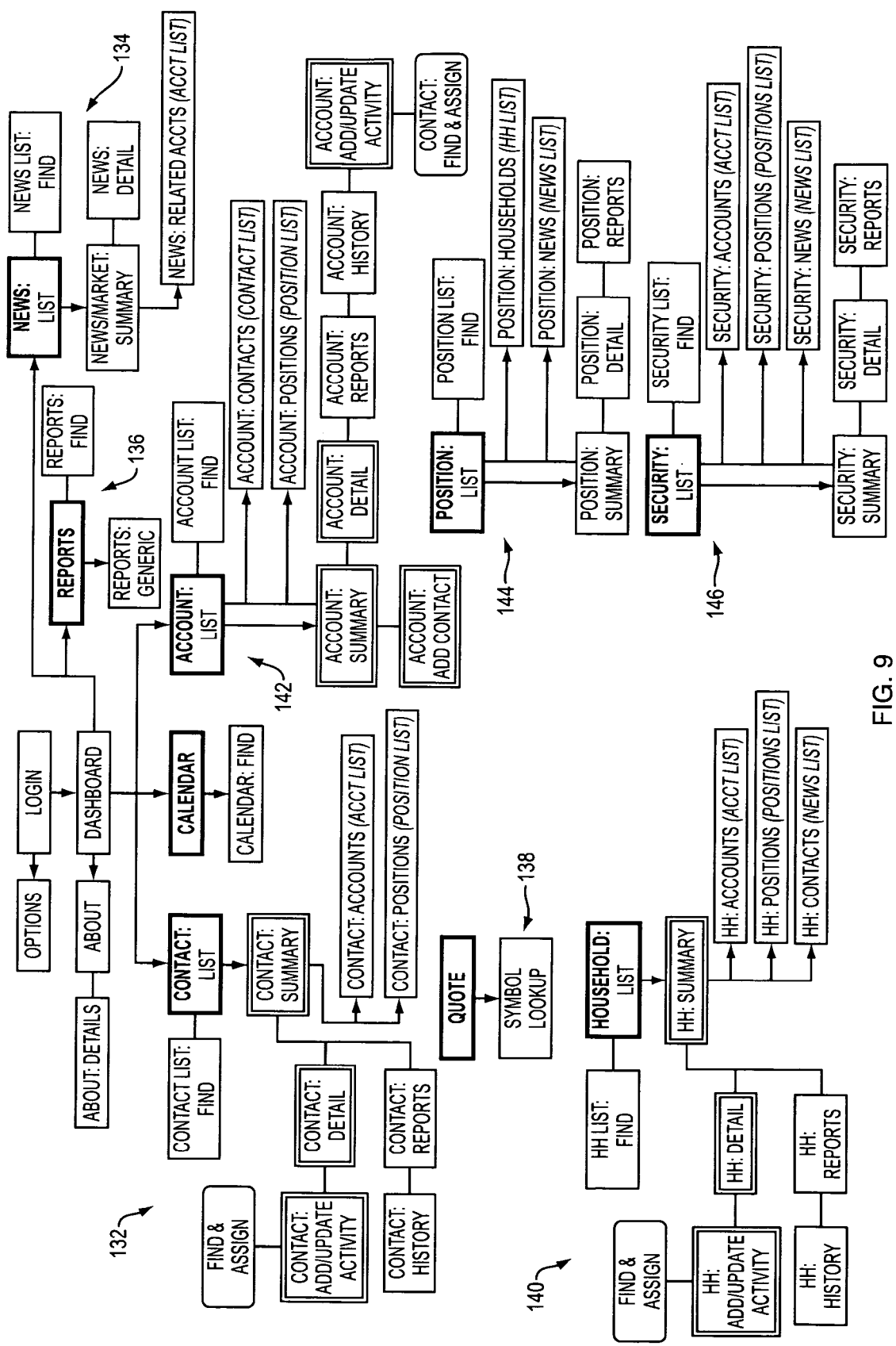
FIG. 9 is a screen navigation map illustrating the relationship between wireless device screens for screens such as those shown in FIGS. 3-8.

Referring to FIG. 9, the wireless application can also make numerous other views available to the financial advisor. These views can manage contacts 132, news 134, reports 136, quote lookups 138, households 140, accounts 142, positions 144, portfolios 146, transactions, securities, prospects, orders, activities and other information the advisor may need.

These additional views can also include information derived in real-time from a variety of different information feeds through the server's back-end plug-in interface and formatted with DDF.

The data integration server 22 includes an administration tool 42, which is a Graphical User Interface (GUI) application that writes retrieval instructions to an instruction data store 44. A wireless data integration engine 28 uses these instructions to respond in real time to later requests received by the web services interface 26 from instances of the wireless application 20. The instructions govern how the wireless data integration server interacts with the back-end plug-ins, such as the CRM plug-in 30, the account system plug-in 34, and the market price plug-in 38.

More specifically, instances of the wireless application running on one or more mobile computers communicate data requests and data responses with the web services interface 26. The wireless data integration engine 28 receives the requests from the web services interface, and loads corresponding preconfigured instructions, splits them by data source and sends them to the appropriate plug-ins for execution. When plug-in execution is complete, the wireless data integration server joins plug-in responses together, adds calculated columns and data driven formatting, and sends a response to the web services interface. The web services interface forwards responses to one or more instances of the mobile application.

Figure 10:
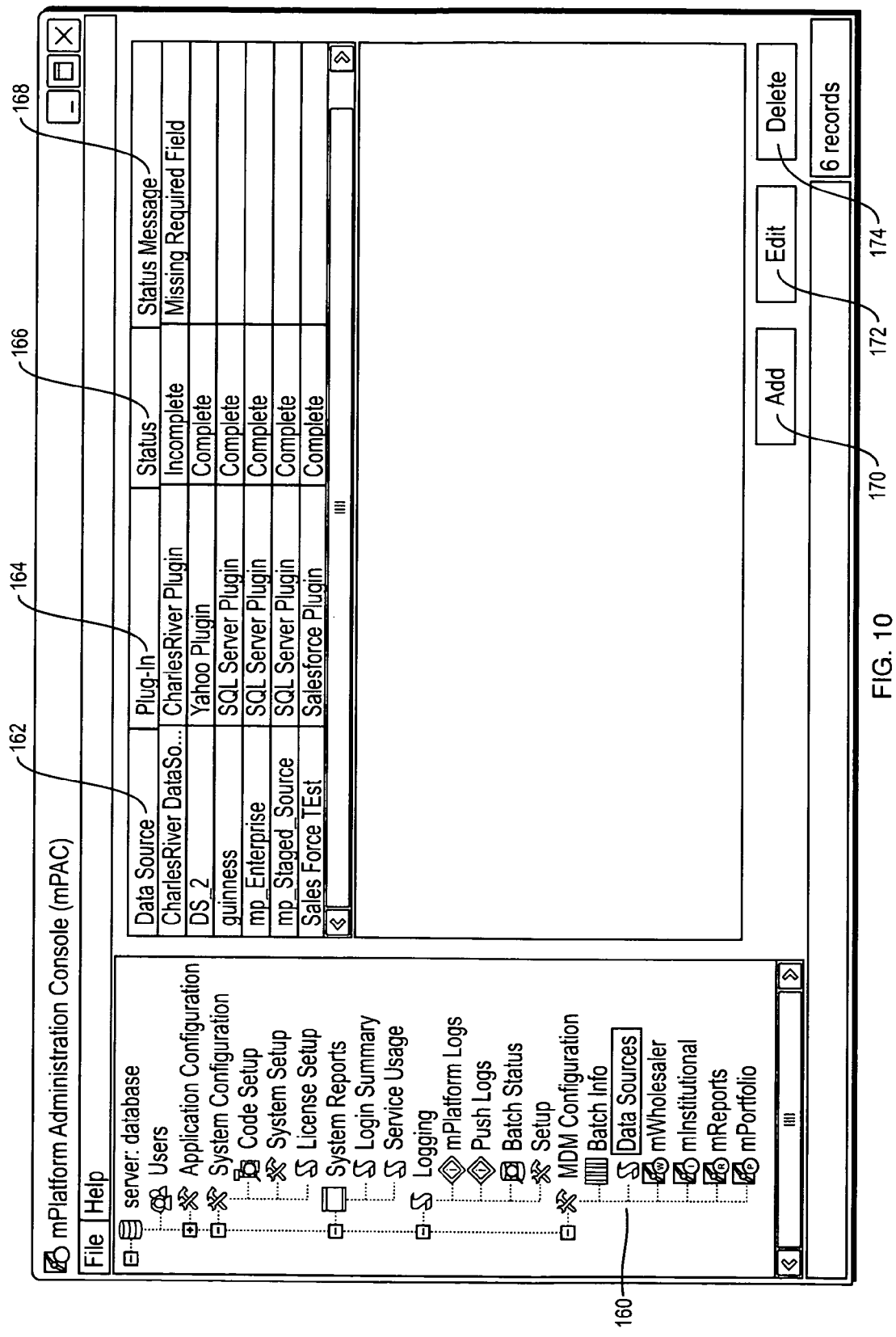
FIG. 10 is a screen shot of a console window of an administrative tool for configuring the wireless advisor support system data integration network of FIG. 1.

Referring also to FIG. 10, before a financial advisor can use the wireless application, a system administrator uses the administrative tool 42 to set up a list of users and to create the data integration instructions and screen layout for each view. The instructions describe what data should be retrieved, updated, or inserted and how that data should be sorted and joined across separate data sources.

In general, the user begins by connecting to a data source and selecting a data integration server entity to be configured. The user can then select source objects, fields, and joins. Selections can be narrowed, fields can be mapped, and data fields can be grouped. Batch confirmation can also be set.

Connecting to a Data Source

To integrate enterprise and third-party data sources with wireless data integration server data, the administrative user first connects to an enterprise or third-party data source using the administration tool 42. In the illustrative embodiment, wireless data integration server administrators access enterprise and third-party data source connection properties across all wireless data integration server applications at a "data sources" node 160 of the administration tool. A right pane of the administration tool 42 then displays a list of data sources 162. Each row of this list corresponds to a configured data source, listed by name, while a row's plug-in column 164 displays the plug-in's Dynamically Linked Library (DLL) for accessing that source. A status column 166 and a status message column 168 display the completion status of required steps in connecting to the plug-in and a message for incomplete statuses.

The user can select a source from the list, and click an edit control 172, such as a button, to change its connection parameters, or click an add control 170 to set a connection to a new data source. A delete control 174 can allow a user to remove a connected data source from wireless data integration engine.

Figure 11A:
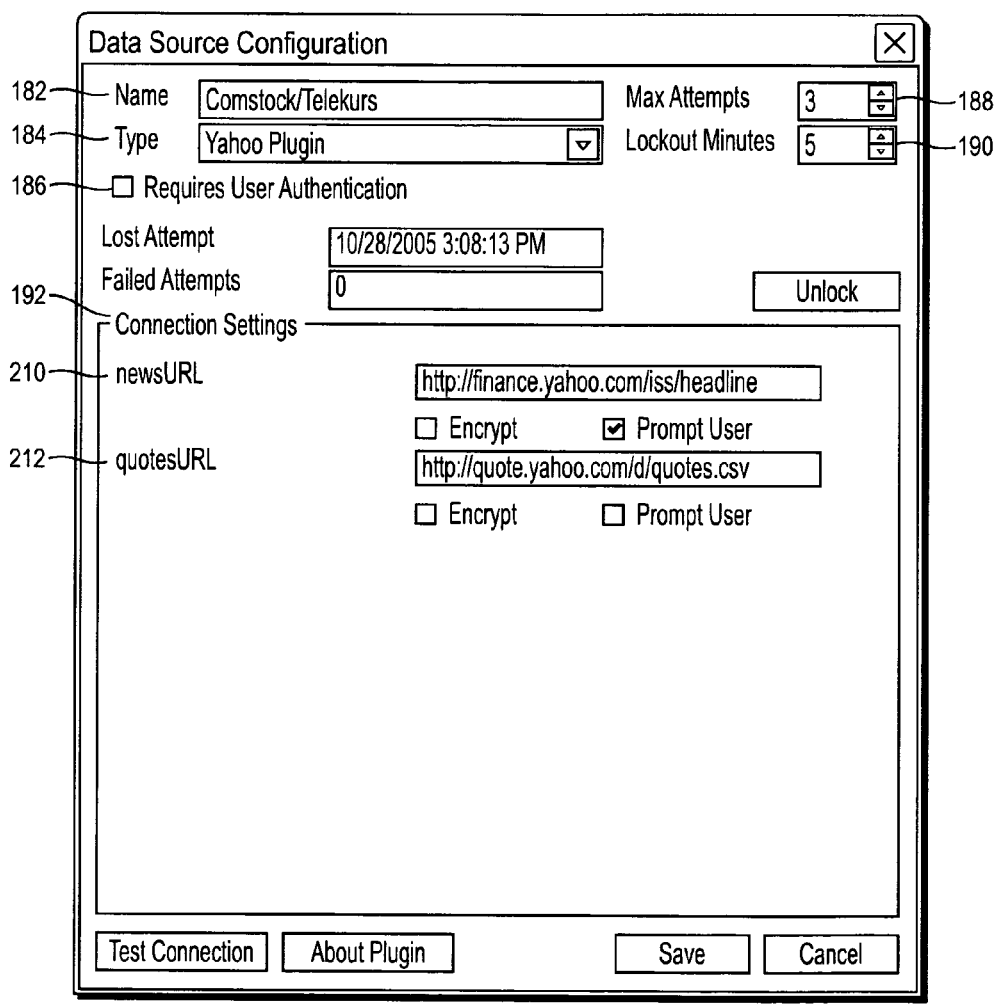
FIG. 11A is data source properties window for a web-based data source for the wireless advisor support system data integration network of FIG. 1.

Referring to FIG. 11, actuating the edit or add controls leads the user to a data source properties window. This window allows the user to view, modify, or enter values for a variety of attributes for a source, such as those listed in Table 1, for a web-plug-in (FIG. 11A).

TABLE 1

| | |
|---|---|
| Name 182 | User-selected name to connote the connection's server, database, URL or login settings when selecting data sources for designing wireless data integration engine configuration from the source objects design canvas, as well as to optionally display on the user authorization screen of the wireless application. |
| Type 184 | Type of data source from plug-ins available, including any user-specific custom plug-in. The selections from the drop-down menu here determine the connection setting values required specific for that plug-in. Types can include web-based types (e.g., for information services such as Yahoo.com, or CRM services, such as salesforce.com), SQL types, XML types, or web service types. Other types can also be accommodated through the use of custom plug-ins, as discussed below. |
| Requires User Authentication 186 | When checked, provides the option to require authentication from handheld users to access the data source. When not checked, requires login from the wireless data integration server administrator only, disabling the option for handheld users to authenticate. |
| Max Attempts 188 | Number of login retries allowed for a successful connection to this data source. |
| Lockout Minutes 190 | Duration of locked access to the data source after exceeding the maximum number of attempts to log in. |
| Connection Settings 192 | Parameters for the selected data source type, coupled with an option to prompt wireless data integration server application users for each parameter when connecting on their handhelds. Different data sources use connection settings parameters specific to them. |

Figure 11B:
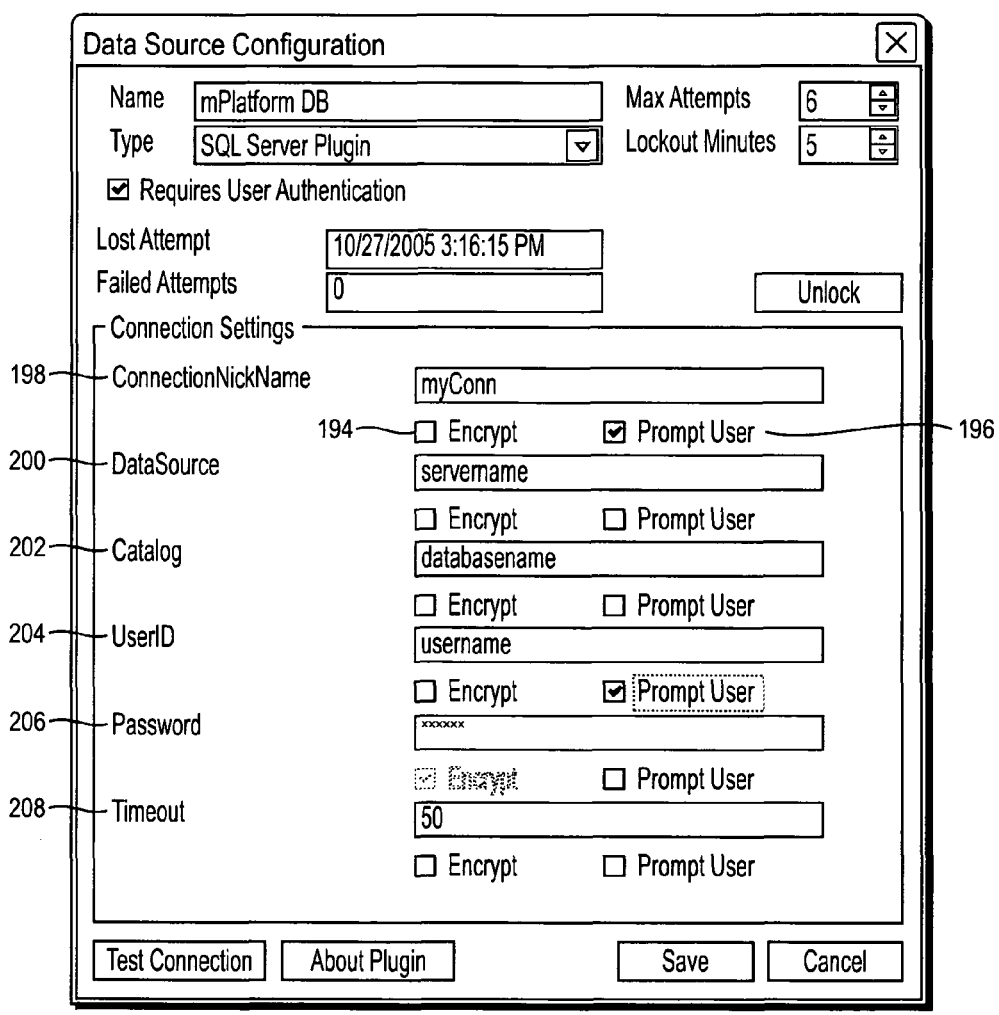
FIG. 11B is data source properties window for an SQL-based data source for the wireless advisor support system data integration network of FIG. 1.

Different data types use different data connection settings, such as those shown in Tables 2-4 for an SQL plug-in (FIG. 11B).

TABLE 2

| | |
|---|---|
| Encrypt 194 | For the selected parameter, obscures the value from view of data source settings per user listed in the user's node of the administration tool 222, as well as optionally on the authorization screen of the wireless application when checked. |
| Prompt User 196 | For the selected parameter, the wireless data integration server application handheld user will receive a prompt to type in the value, most usually the login and password, when checked. This setting is |

TABLE 2-continued enabled only if requires user
authentication is also enabled.

Possible connection setting parameters for SQL server plug-ins can include:

TABLE 3

| Connection Nick Name 198 | An extraneous value for referencing the connection when editing its settings. |
|---|---|
| Data Source 200 | Server hosting the database. |
| Catalog 202 | Database name. |
| User ID 204 | Database login ID. |
| Password 206 | Database password for login ID |
| Timeout 208 | Duration of inactivity required for connection to the data source to time out. |

Possible connection setting parameters for a plug-in for a web-based information service (e.g., Yahoo.com—see FIG. 11B) can include:

TABLE 4

| News URL 210 | Source location of news web service, such as http://finance.yahoo.com/rss/headline. |
|---|---|
| Quotes URL 212 | Source location of stock price web service, such as http://quote.yahoo.com/d/quotes.csv. |

Possible connection setting parameters for other types of web-based services, such as web-based CRM service plug-ins can include user name, password, and URL.

In the illustrative embodiment, two access modes are contemplated. In the first mode, called direct access, the plug-in accesses the data source and returns the requested information in real time. For slower data sources, the plug-in can use a staging utility called the data connector that periodically retrieves and stores data on the server for quick retrieval. Lapses in wireless connectivity may prevent transfer to the handheld device in either mode. These lapses can be handled by caching some types of accessed data and/or predictively caching some types of data, in the handheld device.

In the illustrative embodiment, connection settings within the data source configuration window are system-level parameters. The values administrative users enter here are for wireless data integration server access and connectivity. The user ID and password parameters, for example, serve to connect the data sources within the administration tool 42 for the purposes of integrating that data source's fields using the wireless data integration engine workbench, and therefore, even when checking the prompt user box, are not the login and password of the handheld user. Similarly, for those using the wireless data integration server data connector to stage data, the data connector will use these user credentials for upload. Downloads will use system credentials, even when user authentication is enabled.

The user can actuate a test connection control to validate access and confirm data source connection parameters. The administration tool 42 will respond with a success or failure message. Connections are automatically tested again upon saving wireless data integration engine configuration settings.

Selecting a Wireless Data Integration Server Data Entity for Configuration

Referring to FIG. 12, in this embodiment, the wireless data integration engine is shared by several applications. This document focuses on the application that supports financial advisors, but applications that support other types of professionals, such as wholesalers, can also interact with the wireless data integration engine. To configure data in the wireless data integration engine 28, the user first selects a data entity from the list of wireless data integration server entities for each wireless data integration server application. The wireless data integration engine entity list catalogs all the wireless data integration server entities available for data integration.

Each row of the wireless data integration engine entity list 214 corresponds to an available or configured data entity, listed by name. A row's data set column displays the ID for a data set associated with the entity. A maximum rows column 215, an editable field, refers to the number of rows for the entity brought into wireless data integration engine when requested. An access column 216 reports if the enterprise of a third party source object data within the entity's configuration are set as batched data, direct access, or both. A description column 218 provides a friendlier name for the entity. To configure a wireless data integration engine data entity, the user selects an entity, by double-clicking it.

Figure 13:
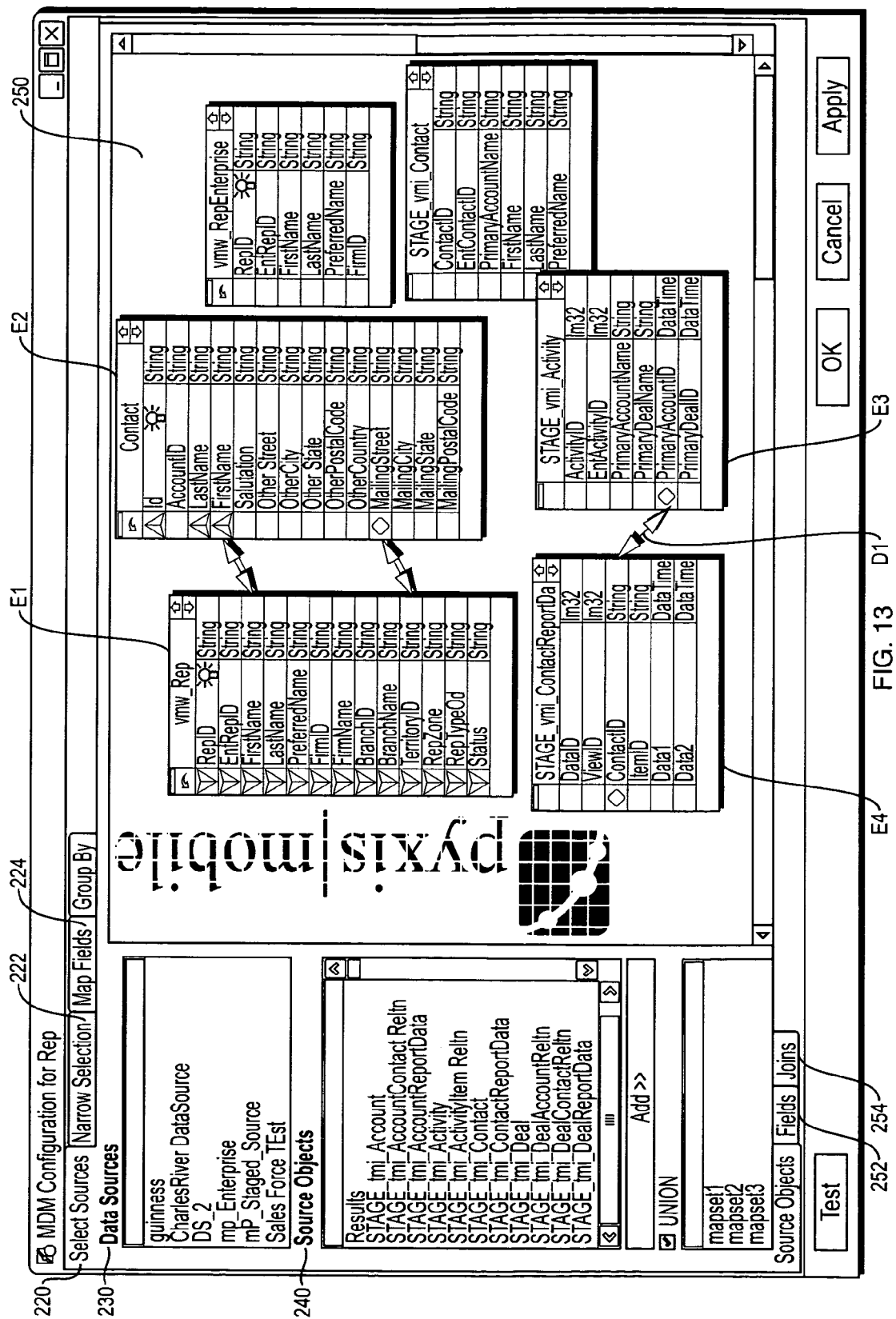
FIG. 13 is a screen shot of the console window of FIG. 10, showing a wireless data integration engine configuration workbench.

Referring to FIG. 13, selecting an entity causes the right pane of the administration tool 42 to display the wireless data integration engine configuration workbench screen. This screen includes a series of tabs along the top: select sources 220, narrow selection 222, map fields 224, and by group 226. Each of these tabs corresponds to a stage in the process of configuring a wireless data integration server data entity in the wireless data integration engine. Tabs along the bottom, which are dependent on the selection of those along the top, access properties of the selected stage. The select sources, narrow selection, map fields, and group and order tabs provide a combination of drag-and-drop, click-and-draw, double-click, and right-click ease-of-use functionality for creation, selection, and modification of elements and settings when configuring mobile data.

Initially, the last saved configuration of the entity for the selected stage of the configuration process is shown. The user can then select a source from a data sources pallet 230 from the top left of the wireless data integration engine workbench, and move it to the design canvas 250. The user can also use a source objects pallet 240 to select source objects. Source object types include views, tables, stored procedures, and user defined functions for SQL Server data sources, and method calls for web data.

Figure 14:
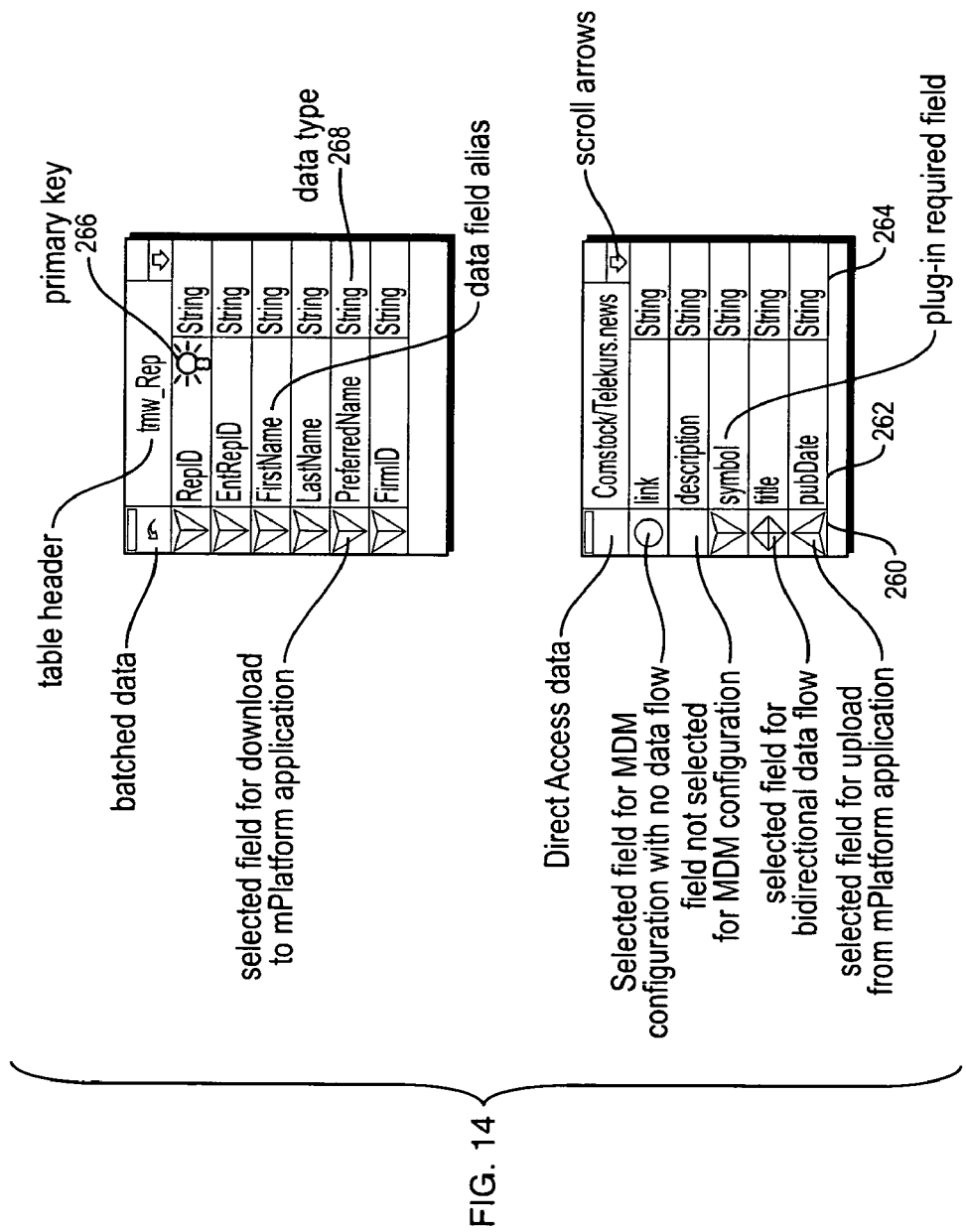
FIG. 14 is a diagram showing two objects for presentation in the configuration workbench of FIG. 13.

Referring to FIG. 14 source objects can be displayed as a graphical table of field properties, titled at the top with the object name. A first column 260 of each row lists the direction of data flow for a field, indicated by an up or down arrow respectively for uploads and downloads, as well as an up and down arrow indicating bidirectional data flow, or a circle indicating no currently configured data flow direction. A second column 262 lists the field alias—using the field name as a default if no alias is specified—corresponding to a row in the wireless data integration server database. A key icon 266 appears beside fields which are primary keys. A third column 264 lists the field's data type 268. A box at the top left corner indicates if the object's data will batch to the wireless data integration server database or be accessed directly.

The source objects design canvas offers drag-and-drop, click-and-draw, right-click, and double-click functionality for quickly configuring source objects, fields and joins. The user can configure source objects, fields, and joins for a data entity within the workbench source objects design canvas by right-clicking or double-clicking an element to assign values. As an alternative design option, the user can focus on a more detailed specification for an object's fields or joins, by clicking the corresponding bottom tab 252, 254, of wireless data integration engine's select sources tab to view a catalog of element values, and to set values using more detailed lists.

Figure 15:
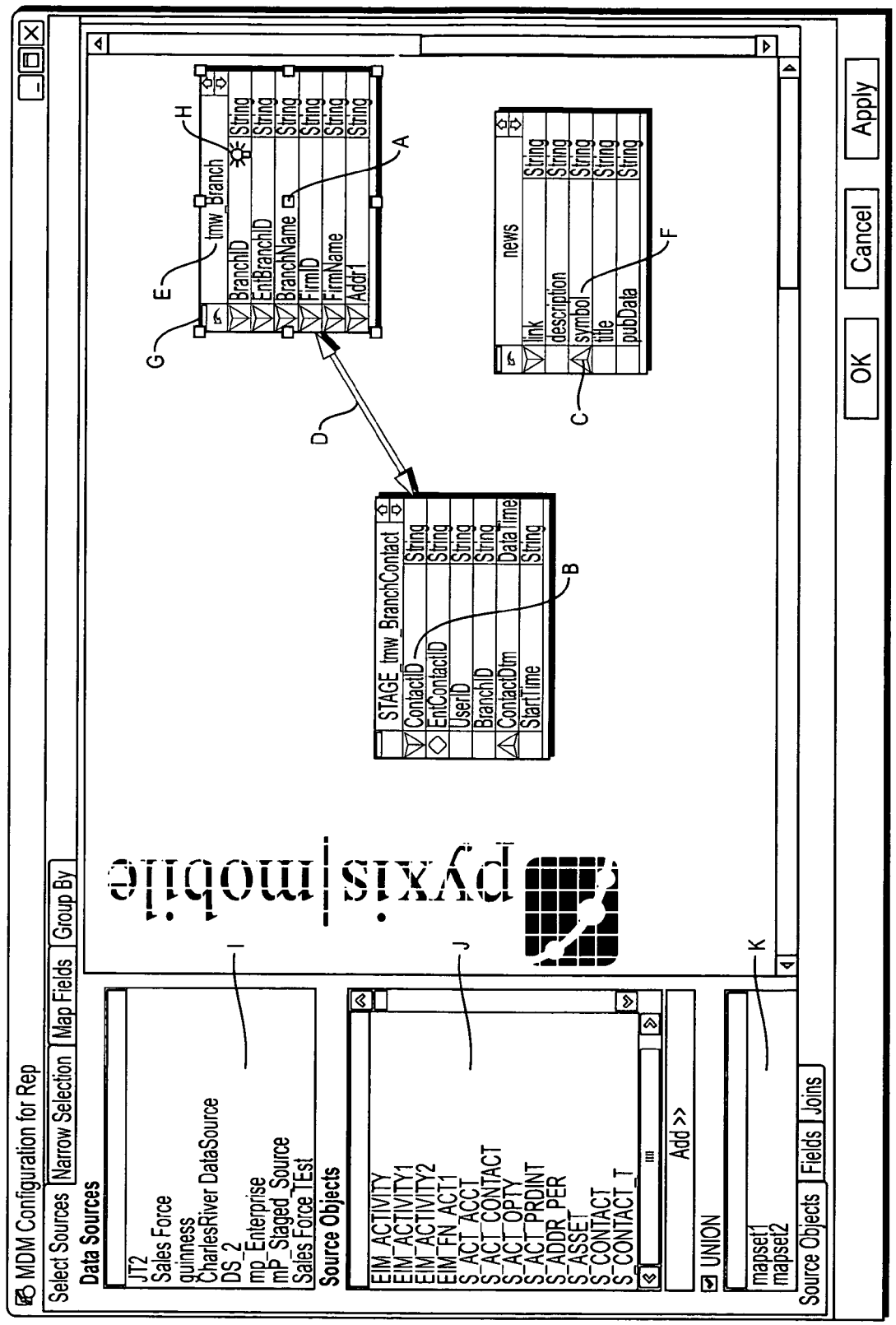
FIG. 15 is a diagram of the console window of FIG. 10, showing the configuration workbench with its features labeled.

Referring to FIG. 15, some workbench source objects design operations are listed in Table 5.

TABLE 5

| Label | Description |
|---|---|
| A | Anchor of a selected data source object. The user can grab this central point to move source objects on the workbench. |
| B | Data field. To select a data field to integrate with the wireless data integration server database, the user can assign it a data directional symbol, or a non directional symbol. |
| C | Data directional symbol. The user can assign data direction by clicking an empty field. He or she can modify the direction by clicking the symbol repeatedly. |
| D | Join between two fields. The user can draw a join line by clicking the source field, holding down the mouse button and dragging to the destination field. To access join properties, the user can right-click or double-click the join line to specify inner or left joins. |
| E | Table header of a data source object table. To access source object properties, the user can right-click or double-click the table header. |
| F | Required input fields. These can be shown in red, and require an input, such as a join or where clause, for the source's plug-in to work. Red fields do not require a directional flow selection unless their source object is set to batch. |
| G | Batch indicator. Allows the user to set data to batch to the wireless data integration server database. If not set as batch, data employs direct access. |
| H | Primary key. Indicates that the field is for the primary key. |
| I | Data sources pallet. A collection of currently configured data sources. |
| J | Source objects pallet. A collection of currently available source objects of the selected data source to add to the workbench. |
| K | Union pallet. When union is checked, a collection of map sets. |

Table 5

Selecting Fields Using Source Object Design Canvas

To select a field of an enterprise or third-party data source for integration with the wireless data integration server database the user can assign it a directional flow or select and assign it to have no directional flow. Flow directions are listed in Table 6.

TABLE 6

| Up Arrow | Data flows via the wireless data integration server, from the wireless application to the enterprise or third-party data field. |
|---|---|
| Down Arrow | Data flows down from the enterprise or third-party data field via the wireless data integration server to the wireless application. |
| Up and Down Arrow | Data flows up and down between the enterprise or third-party data field and the wireless data integration server wireless application. |
| Circle | No data flows between the enterprise or third-party data field and the wireless data integration server wireless application. This direction can be assigned to enable the field for joining, formatting, and narrowing. This assignment will not enable the field for mapping and grouping. |

To modify object properties using the wireless data integration engine source object design canvas the user can right-click or double-click a table header of an object and select one of the properties listed in Table 7.

TABLE 7

| Batched/Direct Access | Batches data to the wireless data integration server database or allows direct access. |
|---|---|
| Properties | The data source object's unique alias and description. |
| First Row | Jumps to the first rows of table, to minimize scrolling. |
| Last Row | Jumps to the last rows of table, to minimize scrolling. |

When assigning a data source object to batch, all selected data fields should have a directional flow. If none is specified, a down arrow is provided by default.

The user can modify and copy fields within the wireless data integration engine source object design canvas. A field can be modified by right-clicking the field and selecting a properties entry in a context menu or by double-clicking the field to open a field properties window. A field can be copied by right-clicking the field and selecting copy to cause the field and all of its properties including its data flow direction to be copied to the bottom of the source object table. To focus on all fields associated with an entity, the user can also click the field's bottom tab of the select sources top tab in the wireless data integration engine workbench to filter a list of fields of all source objects of currently connected data sources, and proceed to configure the fields as discussed below.

A join is a standard database operation that combines records from two or more tables in a relational database. Two principal types are supported by the wireless data integration engine: inner and left. For more information on joins and other SQL operators, see *Learning SQL*, by Alan Beaulieu, O'Reilly Media (2005). For more information about the specific SQL type used in the implementation of the illustrative embodiment, see *Transact-SQL Programming*, by Kevin Kline, Lee Gould, and Andrew Zanevsky, O'Reilly Media (1999).

To add or modify joins using the wireless data integration engine source object design canvas, the user can click one source field, hold down the left-mouse button, and draw a line to the other source field. Joins assign as inner joins by default. The user can add left joins to object fields from the wireless data integration engine workbench source objects design canvas by clicking the left source field, holding down the left-mouse button, and drawing a line to the right destination field. The user can also right-click or double-click the join line and select left as the type. To focus on all joins associated with an entity, the user can also click the join bottom tab 254 of the select sources top tab in the wireless data integration engine workbench to filter a list of joins between all source objects of currently connected data sources.

Figure 16:
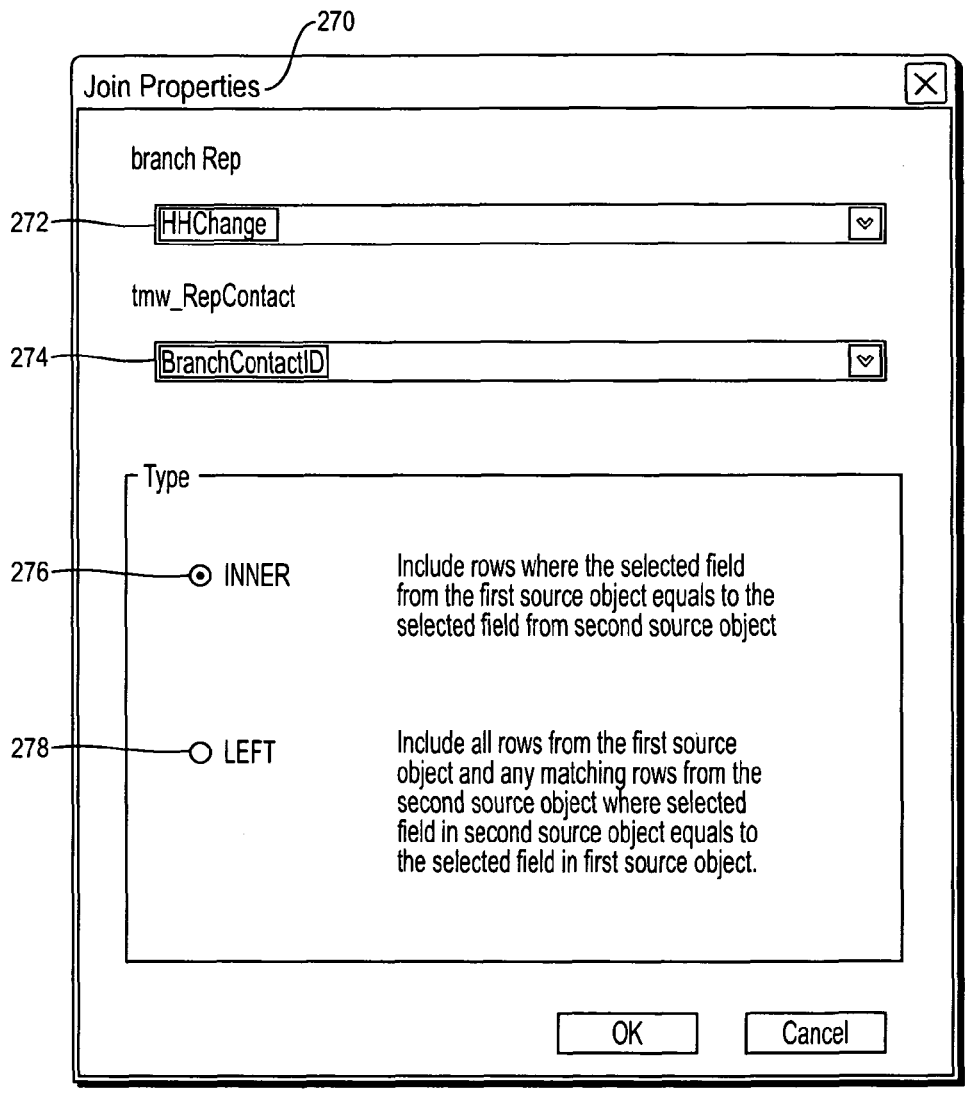
FIG. 16 is a screen shot of a join properties dialog for the wireless advisor support system data integration network of FIG. 1.

Referring to FIG. 16, the user can modify joins to object fields from the wireless data integration engine workbench source objects design canvas, by right-clicking the line representing the join and selecting properties or double-clicking the join line to open a join properties dialog 270. From the join properties dialog, the user can modify the join by editing source object drop-down lists 272, 274, for each field of the selected join. The user can also select inner and left operator controls 272, 274. When assigning inner joins, arrows on the design canvas point to both source fields, and when assigning left joins, arrows on the design canvas originate in the source field and point to the destination field.

Figure 17:
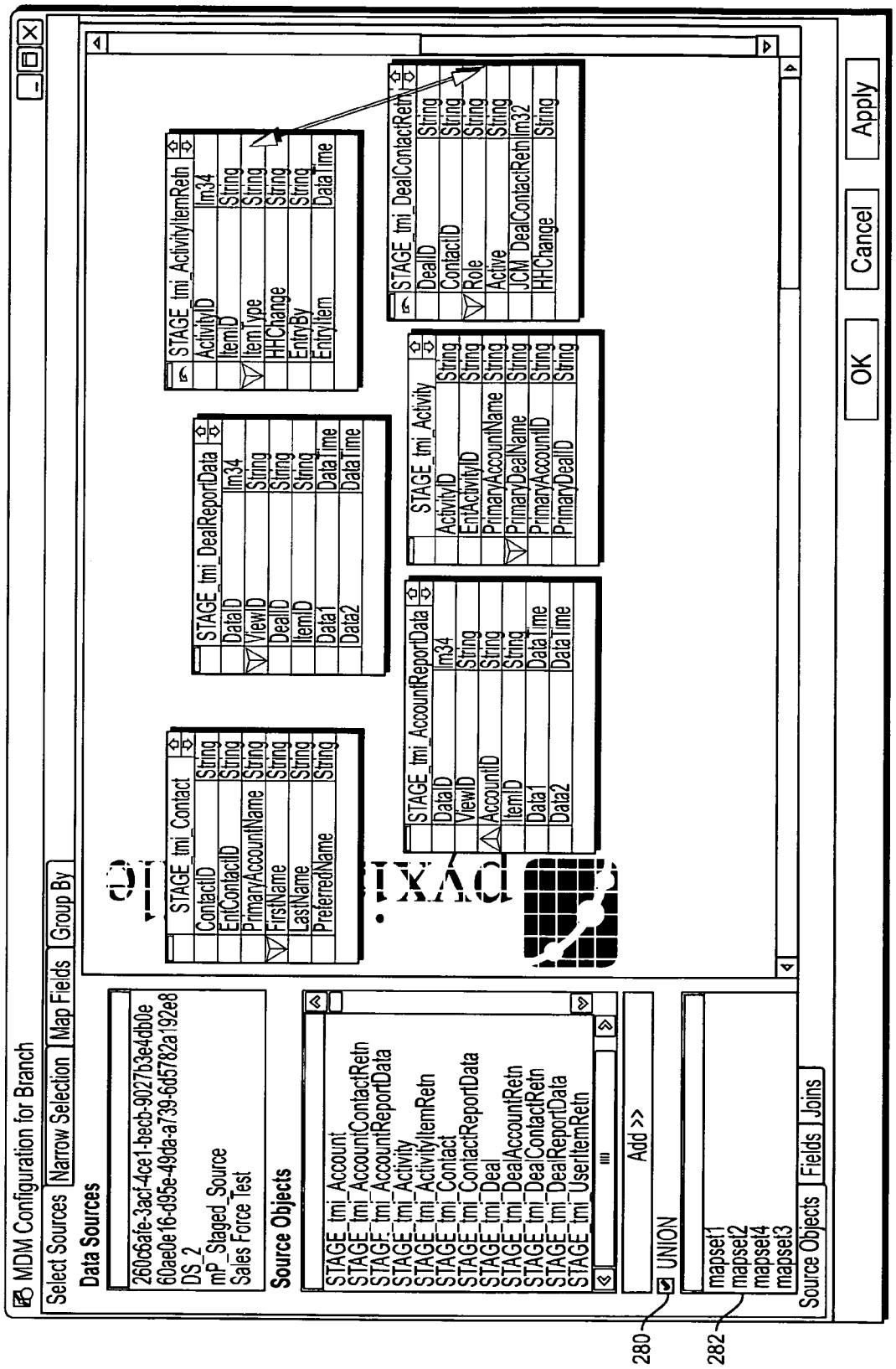
FIG. 17 is a diagram of the console window of FIG. 10, showing the configuration workbench with objects shown in different colors to show union associations.

Referring again to FIG. 17, the user can also add unions to object fields, from the wireless data integration engine workbench source objects. This can be accomplished by clicking a union box 280 under the source objects pallet. When selecting the union box, the administration tool 42 paints the source objects added to the design canvas and lists map sets in the map set pallet below the union box. Each map set displays tables grouped by color, painting those being used by the same map set in the same color on the design canvas. Individual source objects represent a map set, and joined source objects together represent a single map set. A map set can be selected by right-clicking the map set name in the union pallet. If one map set is selected for upload in the illustrative embodiment, no other map sets for the entity under configuration can have any fields selected for upload or bidirectional data flow. The user can save any changes to the wireless data integration server database.

Figure 18:
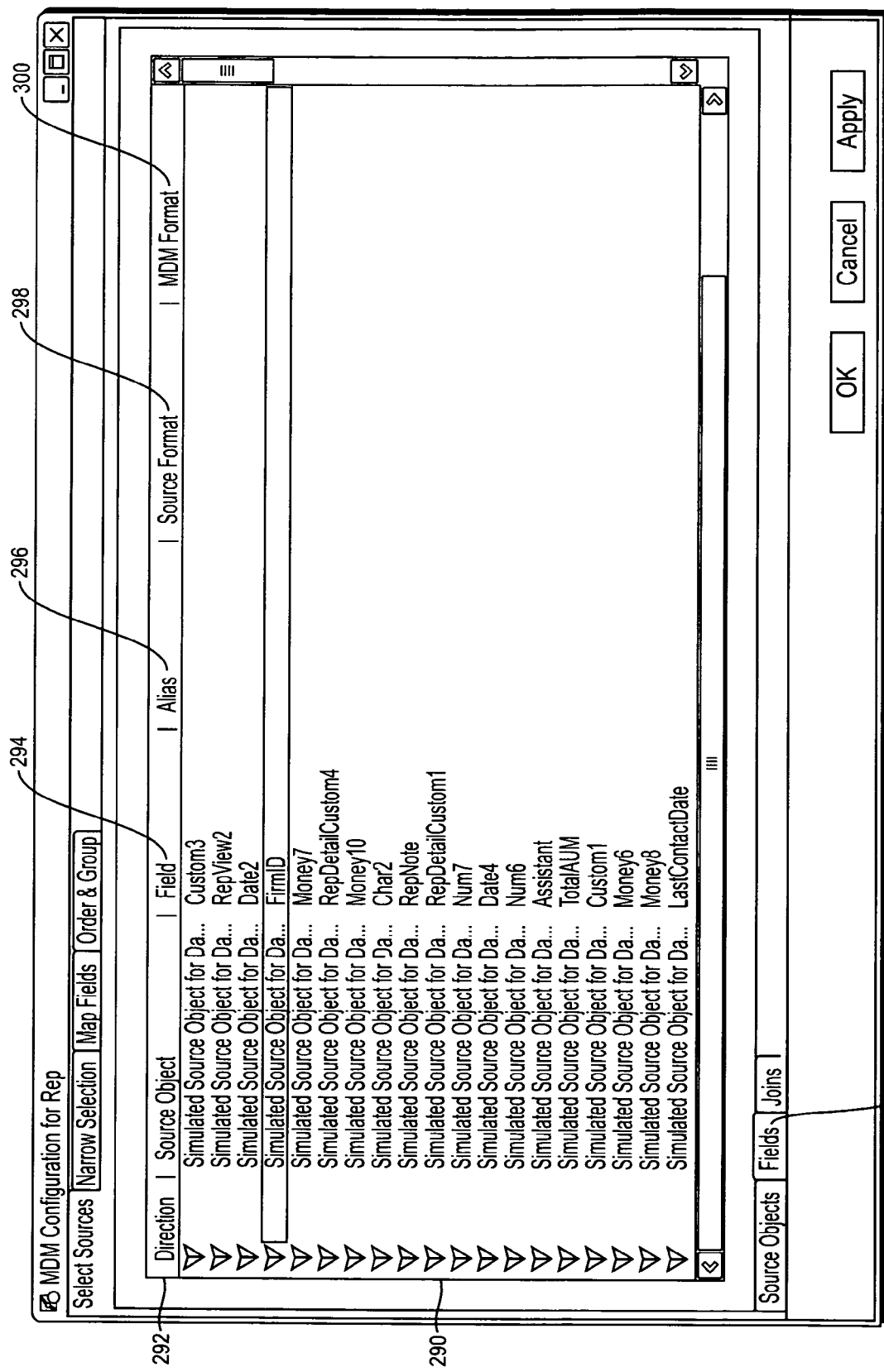
FIG. 18 is a diagram of the console window of FIG. 10, showing a field property list.

Referring to FIG. 18, from the fields bottom tab 252 of the wireless data integration engine's source objects, users can view a list of all currently configured properties for the fields of the added source objects to the entity currently under configuration, as well as enter or modify source and wireless data integration engine formatting expressions for those fields. The wireless data integration engine configuration workbench displays a catalog of all fields of all source objects of currently connected data sources for the entity under configuration. Each row of the fields list 290 corresponds to a field of the current entity under configuration while a row's columns display the current configuration of that field. The first column of each row lists the directional data flow for a field 292. Subsequent columns list the field's name 294 and alias 296, followed by its source formatting 298 and wireless data integration engine formatting expressions 300.

Double-clicking a field leads to a field properties dialog. This window includes an alias box that allows the user to enter or edit an alias name for the field. The user can also enter or modify a source formatting expression for the field in a source formatting tab of the field properties window. This is an expression that is meaningful to the plug-in, which can be, for example, an SQL expression such as a cast expression to display an integer as a string.

The user can also enter or modify a wireless data integration engine formatting expression for the field, using a wireless data integration engine formatting tab. This expression can be a Microsoft C# DataColumn.Expression property executed on the data in wireless data integration engine after the plug-in retrieves it, such as TrimEnd(','). This implementation provides for a variety of well-known formatting functions, such as trimming, selective extraction, and conditional retrieval. Other types of formatting expressions having suitable formats could of course be used for the source formatting expression and the wireless data integration engine formatting expression.

Figure 19:
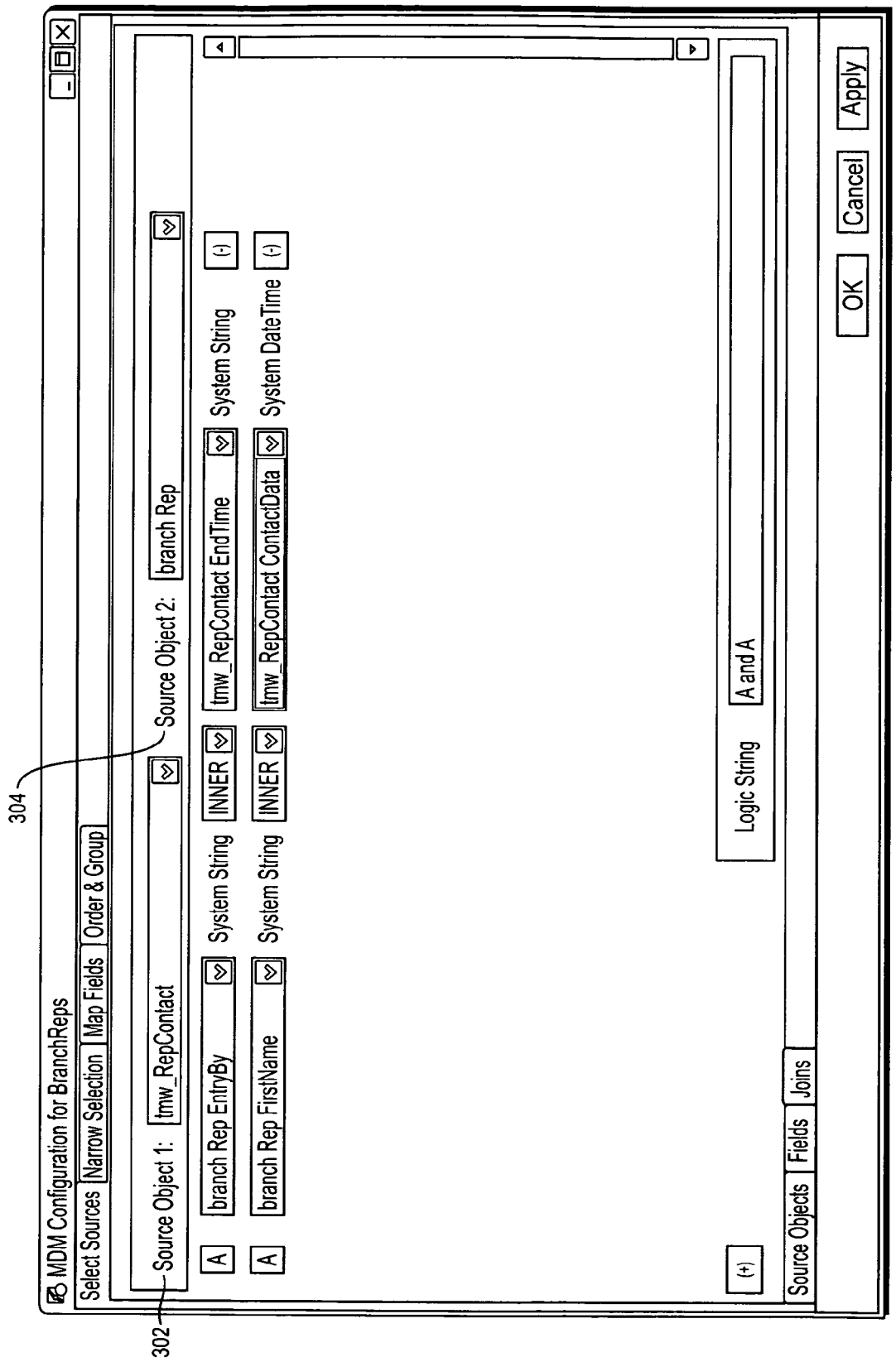
FIG. 19 is a diagram of the console window of FIG. 10, showing a filtered joins properties list.

Referring to FIG. 19, users can also view a filtered list of all currently configured properties for the joins of source objects by clicking the joins bottom tab of the select sources tab in the wireless data integration engine workbench. This list is a catalog of all joins between fields of source objects of currently connected data sources for the entity under configuration, filtered by the source object relation at the top. Each row of the joins list corresponds to a join instruction in relation to the left and right fields of source objects selected at the top, listed by a lettered alias which corresponds to those in the logic string. From there the instruction reads across as join syntax, wherein data field strings join per a drop-down list of operators. Wireless data integration server administrators assign the focus of the joins list by selecting two source objects of currently connected data sources from drop-down lists named source object 1 302 and source object 2 304. These filters serve as the left and right source objects for join fields, depending on the selected operator. For inner joins, source object 1 serves as the left, and source object 2 serves as the right.

The user can create or modify joins between fields of enterprise or third-party data sources for wireless data integration server data entities by adding or editing join instructions to the entity currently under configuration by using the following as needed:

TABLE 8

| | |
|---|---|
| (+) | A button that adds a new instruction to the list of joins for a selected left and right source object filters at the top. |
| Logic String | Join clause. A box where a user can edit the relation of join instructions, referenced by each instructions lettered label. This box supports "and," "or," and "( )" values. |
| String drop-down lists | Joined fields of the selected left and right source objects. |
| Operator drop-down lists | Operator of the joined fields of the selected left and right source objects. The administration tool 222 supports inner and left operators. |
| (−) | A button that deletes the instruction from the list of joins. |

Narrowing Selections

Figure 20:
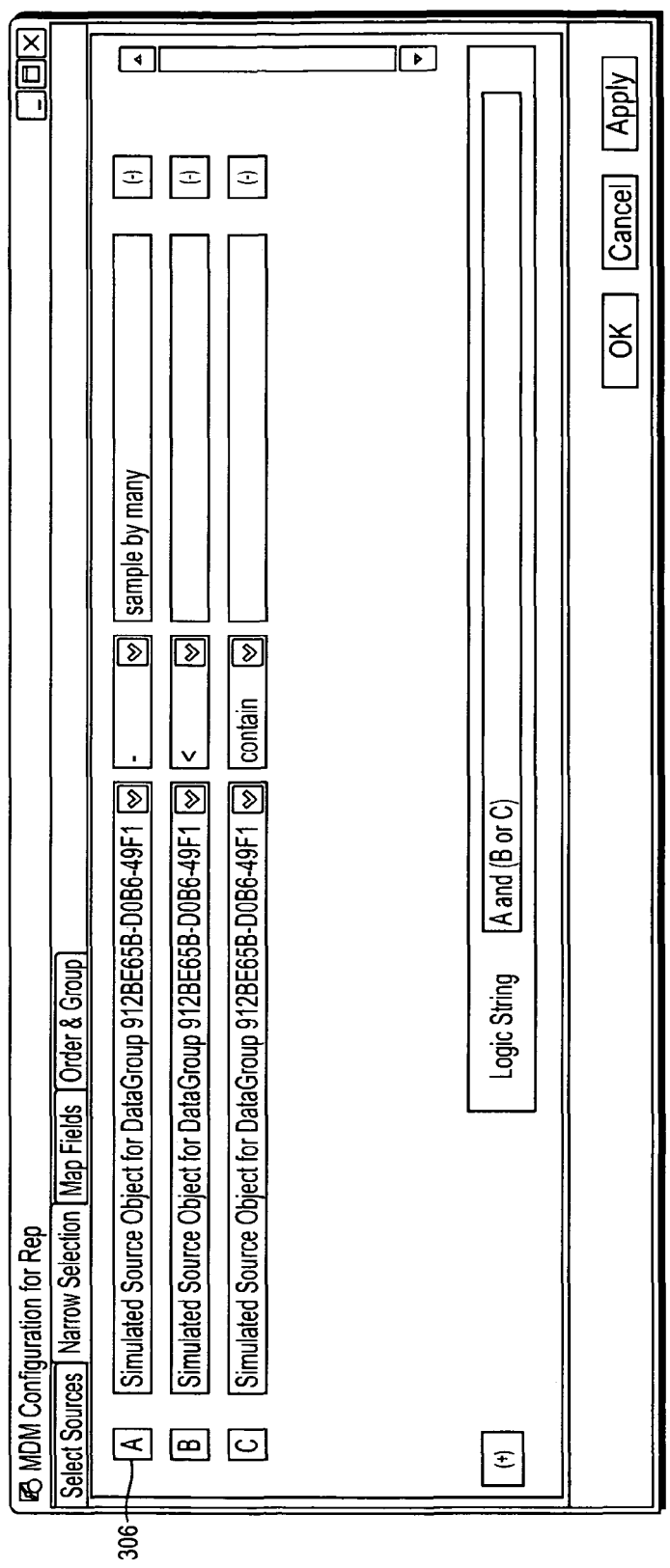
FIG. 20 is a diagram of the console window of FIG. 10, showing a narrow selection list.

Referring to FIG. 20, wireless data integration server administrators can narrow the selection of enterprise or third party data sources, or both, on the wireless data integration server database entity level at the narrow selection tab of the wireless data integration engine configuration node for a wireless data integration server application. The resulting narrow selection dialog displays a catalog of all assigned filters between the fields of source objects of currently connected data sources for the entity under configuration. Each row 306 of the narrow selection list represents a where instruction, listed by a lettered alias which corresponds to a logic string. From there the instruction reads across as where syntax, wherein data field strings filter per a drop-down list of operators.

The user can create or modify filters between enterprise or third-party data fields for wireless data integration server data entities by adding or editing where instructions for the entity currently under configuration, using the following as needed:

TABLE 9

| | |
|---|---|
| (+) | A button which adds a new instruction to the list of filters. |
| Field drop-down lists | Filtered fields of selected left and right source objects, syntactically named, source.object.field. |
| Operator drop-down lists | An operator of the filtered fields of the selected left and right source objects. |
| Literal Value | A literal according to the instruction's operator in keeping with the syntactical rules below. |
| (−) | The button which deletes the instruction from the list of filters. |
| Logic String | The where clause. The location for editing the relation of the where instructions, referenced by each instructions lettered label. This box supports "and," "or," and "( )" values. |

The syntax for literals is as follows:
1) If the operator is '=', '<>', '<', '<=', '>', '>=', contains, starts with, or ends with, the value string should construct a meaningful where clause; the user can use logic identifiers to create a logic string. The administration tool 42 will warn for any unrecognizable identifier.
2) If the operator is "in" or "not in," the value string can contain
   a) User comma-separated values enclosed in brackets
   b) Use single quotes around literals
   c) Use double single quotes for literals that contain single quotes.
3) If the operator is "is null" or "is not null," the value should be disabled When narrowing selections of entities containing unions, the administration tool 42 can require administrative users to enter the following values instead of field drop-down lists:

TABLE 10

| | |
|---|---|
| Map Set drop-down list | Possible map set sources to be filtered, named by the map set name assigned from the union pallet of the source objects design canvas of the wireless data integration engine workbench. |
| Map Set Source drop-down lists | Filtered fields of the selected map sets, syntactically named source.object.field. |

Mapping Fields

Figure 21:
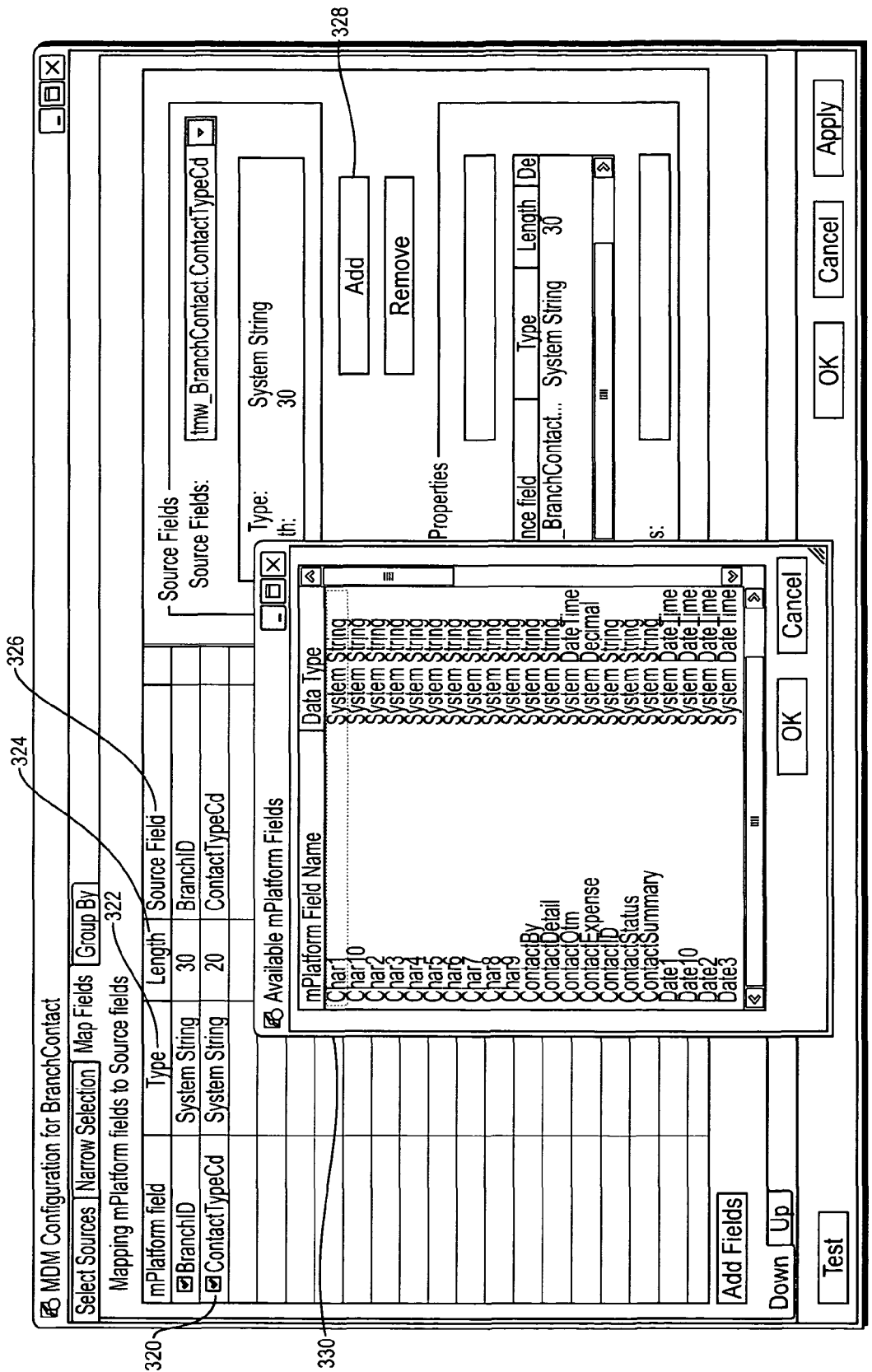
FIG. 21 is a diagram of the console window of FIG. 10, showing field mapping controls.

Referring to FIG. 21, the user can map data selected from enterprise and third-party sources with data from wireless data integration server entities. Mapping enterprise or third-party data, or both, to wireless data integration server entities allows the use of those data fields on wireless data integration server application screens.

To map fields of enterprise and third-party data sources to those of a selected wireless data integration server entity, for both download to wireless data integration server fields and upload to enterprise or third-party data fields, the user can click the map fields tab 224 of the wireless data integration engine workbench (FIG. 13.) This tab provides a lower download tab and a lower upload tab. The download tab displays a catalog of all currently mapped fields from enterprise and third-party data sources for connected data sources to the wireless data integration server data for the entity under configuration. Each entry in this list includes a checkbox that indicates a configured mapping instruction. Each row of the mapped wireless data integration server fields list displays properties of the wireless data integration server data field source, and when mapped, displays the name of the enterprise or third-party data field destination. The first four columns of the mapped wireless data integration server fields list the field name 320, data type 322 and maximum character length 324 for a wireless data integration server data field 326.

To add a new mapping instruction, the user begins by selecting a wireless data integration server field for mapping and clicks an add fields button 328. An available wireless data integration server field window 330 is then displayed, and this window allows the user to select the wireless data integration server field as a source to map for download. The selected wireless data integration server field then populates in the mapped wireless data integration server fields list, adding the source of a new instruction to the list.

The user can then map wireless data integration server source fields to enterprise or third-party data sources, or both, destination fields by selecting the wireless data integration server source field from the mapped wireless data integration server fields list, and then, in the right pane of the down bottom tab of map fields, selecting a destination field from the source fields drop-down list, and clicking add. The source field's drop-down list includes all fields marked for download or bidirectional data flow on the source objects design canvas, as well as a default dedicated to each map set for unioned data. Enterprise and third-party data source fields are syntactically named source.object.field.

When mapping wireless data integration server entities to fields of unioned data, in addition to destination fields selected for download, values signifying map sets also list in the source fields drop-down. It is important to assign destinations as multiple map set values in order to set the defaults individually for each. In the mapping properties section of the right pane of the down bottom tab of map fields, the user has the option to enter an alias for the wireless data integration server field for use in screen views and reports. In the mapping properties section of the right pane of the down bottom tab of map fields, the user can then define a default value for all null fields of the enterprise or third-party data destination field. Mapping instructions can also be removed and edited.

To map wireless data integration server data destination fields to enterprise and third-party data source fields for upload, the user selects the enterprise or third-party data source field from the mapped destination fields list, then in a right pane of the upload bottom tab, selects a source field from the wireless data integration server fields' dropdown list, and clicks add. This brings the user to a view that is similar to the download view, and includes a source fields list. The mapped source fields list includes all enterprise and third-party data source fields marked for upload or bidirectional data flow on the source objects design canvas. The wireless data integration server fields' drop-down list includes available wireless data integration server fields for enterprise and third-party data sources to upload to for the entity under configuration. The enterprise or third-party data field populates in the mapped source fields list, adding the source of a new instruction to the list and checking the left-most box signifying a configured mapping instruction.

Grouping Data Fields

Figure 22:
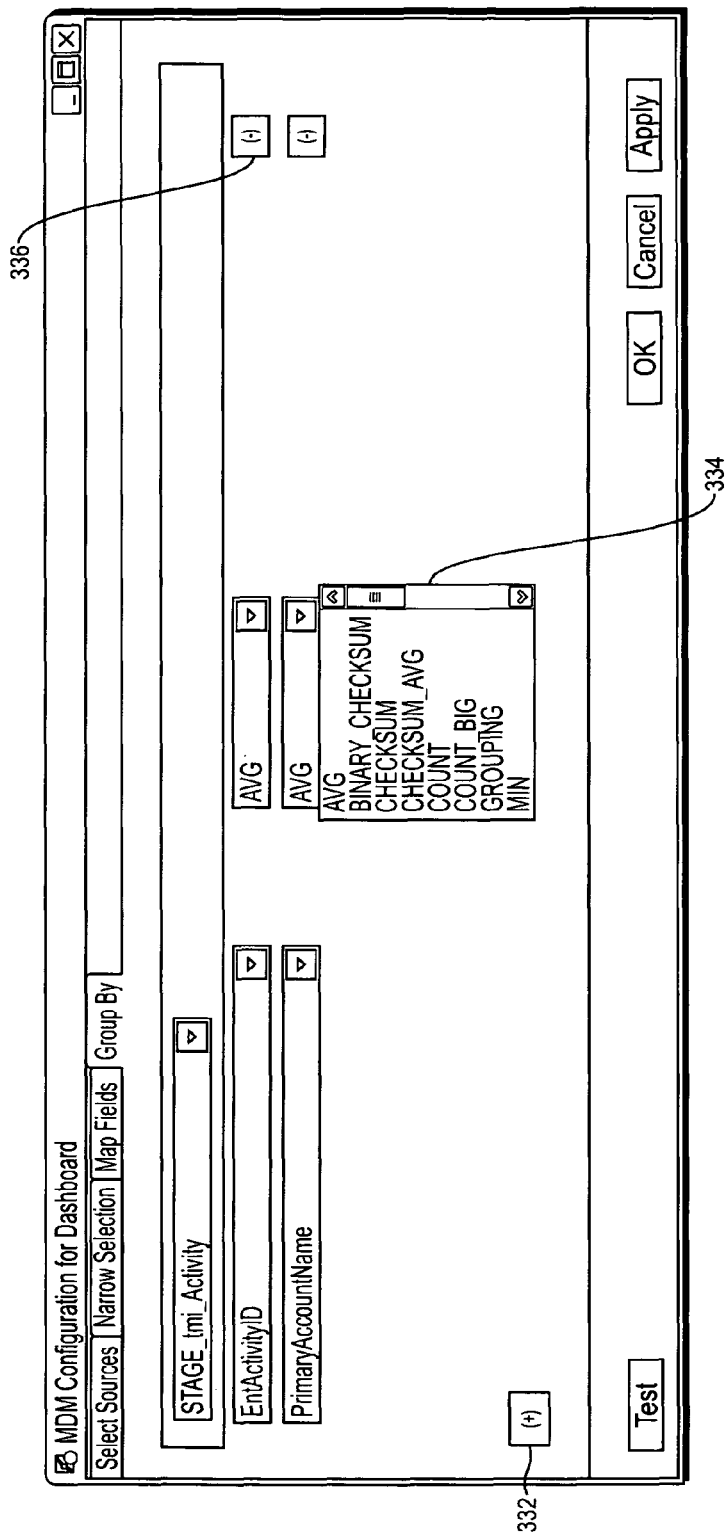
FIG. 22 is a diagram of the console window of FIG. 10, showing data field grouping controls.

Referring to FIG. 22, to group or aggregate data selected from enterprise or third-party data sources, or both, with data from wireless data integration server entities, the user can click the group by tab of the wireless data integration engine workbench. This tab provides a list of all currently aggregated fields of enterprise and third-party data sources, selected within the source objects design canvas for the entity under configuration, and filtered by those fields by source objects at the top. The user can then assign aggregation to additional fields, or change the aggregation of already assigned fields of selected source objects, by filtering by source object at the top-most drop-down list, then adding a field to group for each, and finally assigning the aggregation operator by employing the following as needed:

TABLE 11

| (+) 332 | The button which adds a new field to the list to group for a selected source object filtered at the top. |
|---|---|
| Aggregation Operator drop-down list 334 | An aggregation assignment for the field. The administration tool 42 supports a substantial collection of standard aggregation types. |
| (−) 336 | A button which deletes aggregation from the field of that row. |

The user will be able to aggregate all data fields selected within the source object design canvas after he or she has mapped each enterprise or third-party data source field to wireless data integration server data will that aggregation apply to wireless data integration server application screens.

Setting Batch Confirmation

Figure 23:
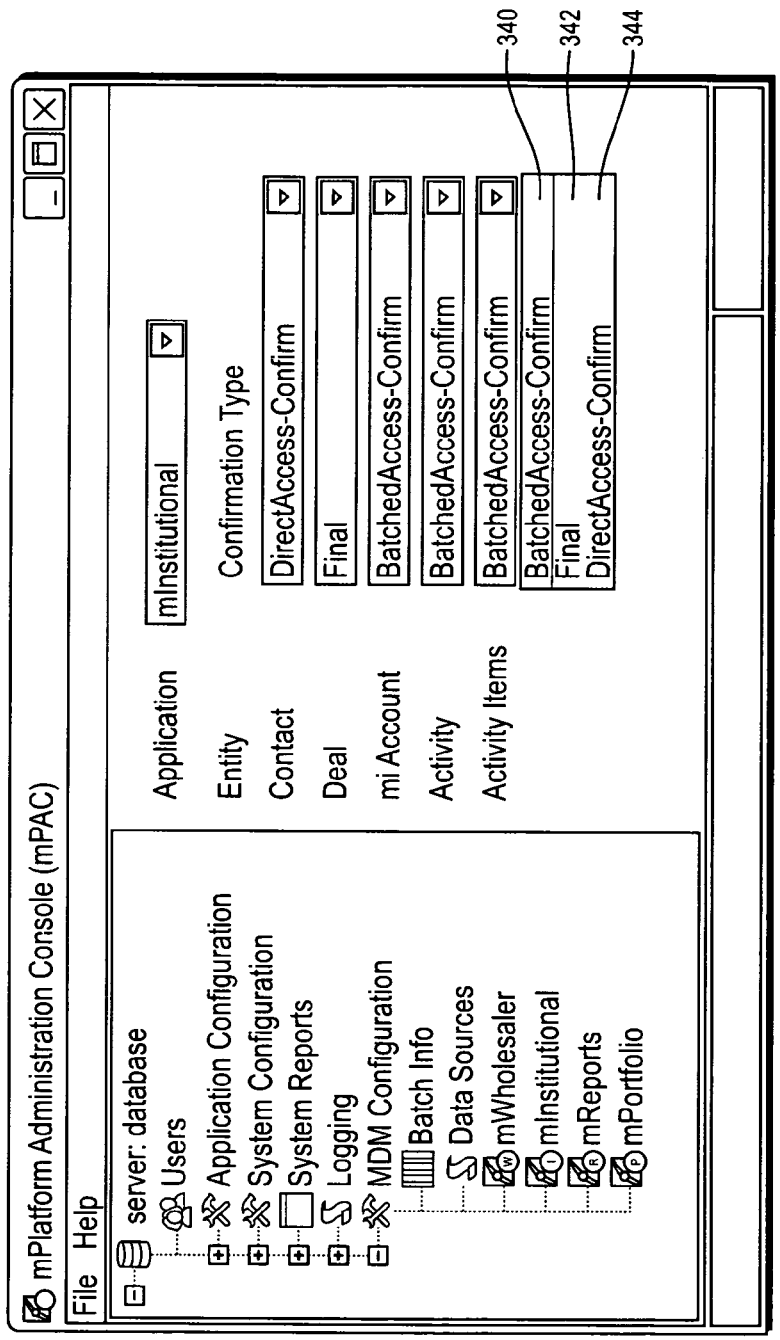
FIG. 23 is a diagram of the console window of FIG. 10, showing a batch confirmation list.

Referring to FIG. 23, the wireless data integration server application screens can support some options for confirmation of data uploads to enterprise and third-party data sources. To set the type of confirmation status for uploads to enterprise or third-party data sources, or both, the user can, in the left pane of the administration tool 42, click wireless data integration engine configuration, and then click batch info. This causes the right pane of the administration tool 42 to display batch confirmation type drop-down lists for wireless data integration server data entities that support upload, filtered by the selected wireless data integration server application at the top. From an application drop-down list, the user can filter the batch confirmation options by selecting the name of a wireless data integration server application for which he or she intends to set confirmation frequency. The user can then assign a confirmation method, or select no confirmation, for the available entities by assigning the following frequencies as needed:

TABLE 12

| Batched Access-Confirm 340 | Batch updates report as an upload confirmation on the next batch run. This option is appropriate if the user's organization batches data, requires confirmation through a full roundtrip to enterprise or third-party data source, and its business model supports sharing primary keys of the updated database tables. This is the default confirmation setting. |
|---|---|
| Final 342 | Confirms the update at is it happens. This option does not provide the added level of verification of roundtrip confirmation. To verify an update to an enterprise or third-party data source, the user can check the record in the source directly. This option is appropriate if the user's organization requires confirmation without a full roundtrip to data sources such as CRM data sources. This setting applies to both batched and direct access data. |
| Direct Access-Confirm 344 | This option is appropriate if the user's organization does not batch data, requires confirmation through a full roundtrip to enterprise or third-party data sources, and its business model supports sharing the primary keys of the updated database tables. Round trip confirmation for direct access data requires the user to write a conversion process to convert the confirmation status from "C" to "F" in order to avoid performance degradation. |

Conditional Formatting

Figure 24:
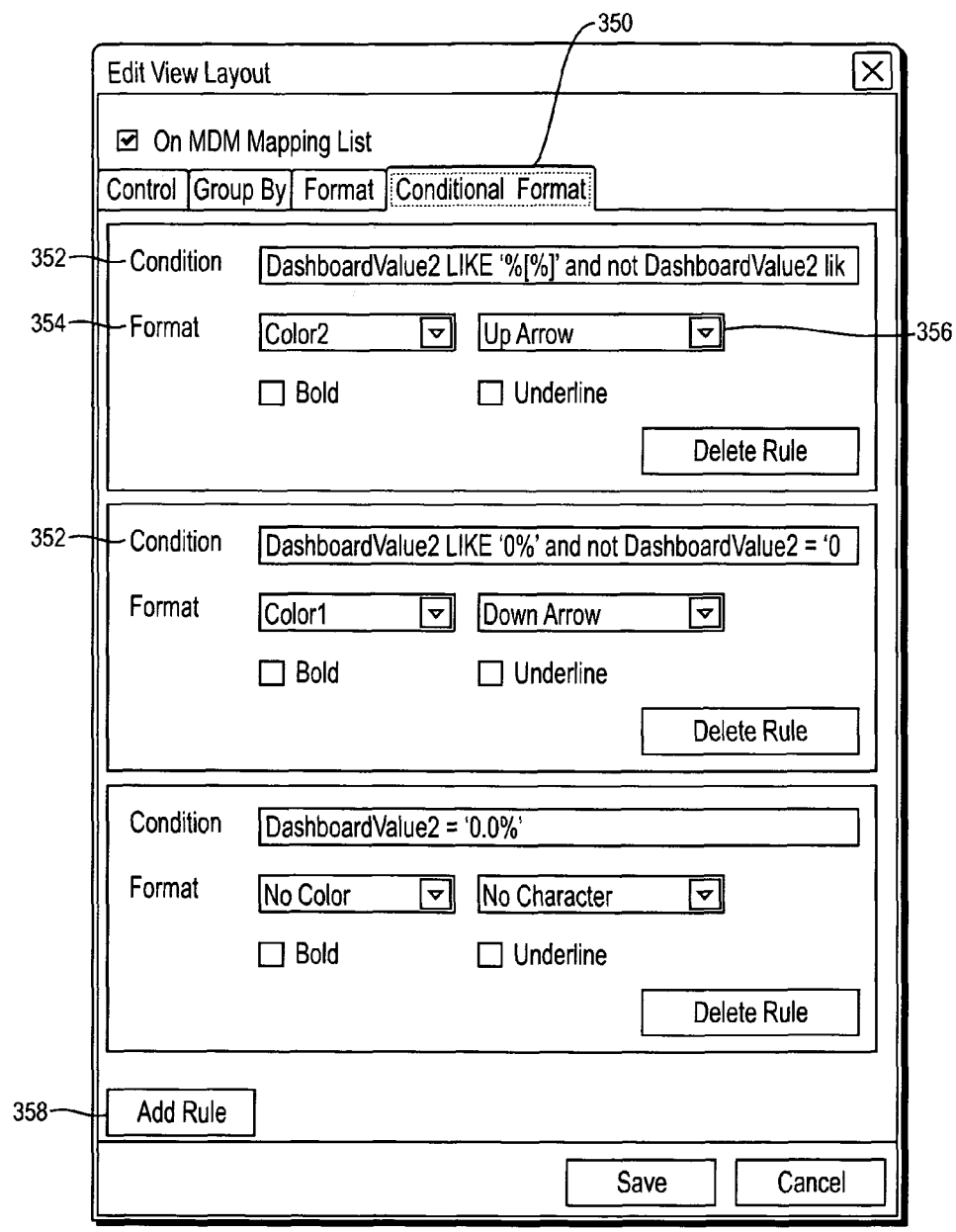
FIG. 24 screen shot of a layout view control dialog for the wireless advisor support system data integration network of FIG. 1.

Referring to FIG. 24, administrative users can access a conditional format tab 350 of a view layout screen that allows them to apply conditional formatting to data to be presented on screens of the wireless handheld. This screen is reached through an application configuration entry in the administration tool 42 for a particular controls screen.

The conditional format tab lists a number of formatting rules for a selected control in a view to be presented by the wireless application. To add a rule, the user can click an add rule button 358. He or she can then specify a condition 352 required of the data for a selected control to meet in a condition box. This box can be filled in to include the name of the data field (e.g., DashboardValue2) and other matching commands. The following examples illustrate the use of this line:

EXAMPLE 1

DashboardValue2 LIKE '—%'

This condition applies selected formatting, such as red values beside a red down arrow, to all values that begin with a negative sign.

Note: In this example, DashboardValue2 is the field of data of the selected control; % is a wildcard. Wildcard values belong in single quotes.

EXAMPLE 2

DashboardValue2 LIKE '%[%]' and not DashboardValue2 like '—%'

This condition applies selected formatting, such as green values beside an up arrow, to any value that ends in a percent sign, and does NOT begin with a negative sign.

Note: In this example, the brackets act as escape characters allowing the '%' symbol to be presented on the handheld device.

EXAMPLE 3

DealMoney1>400000

This condition applies selected formatting, such as a bolded green text beside an asterisk, to any value greater than 400,000.

Two format drop-down lists allow the user to select options for data to format when meeting a rule's condition. The first 354 allows the user to assign system colors to text when the condition is met. The second 356 allows the user to assign a symbol to be placed beside the text when the condition is met. Bold and underline checkboxes allow the user to bold and/or underline the data when a condition is met. When data does not meet a specified condition, it formats in a default color set. There is also an option to create a rule that is the inverse of an earlier rule.

This illustrative conditional formatting control set can provide powerful functionality for financial advisors using commonly available wireless devices. But the matching syntax and format options could readily be extended to operate in a different way or to provide additional functionality.

Creating Plug-Ins

Plug-ins make it possible for the wireless data integration engine to manage queries, updates, and integration of data including enterprise CRM and order management systems, as well as other third-party data sources such as Reuters, Dow Jones, and data warehouses. Users of the wireless advisor support system with programming skills can use an API to develop their own custom plug-ins, enabling them to access and update proprietary systems or additional third-party data sources by developing custom plug-ins. The wireless data integration engine accommodates delivery of both real-time and scheduled data integration and supports interfaces via ODBC, web services such as SOAP, as well as direct API, COM, and HTTP protocols. In this embodiment plug-ins are written in the plug-in Application Framework (PAF) 260 an application framework that implements a standard interface, and inherits from a base plug-in class. The Microsoft® .NET Framework is used to provide access to system functionality and as a basis for building plug-ins and other parts of the system, such as through the use of C#. Of course, other types of tools and platform environments could also be used to build these parts.

The PAF essentially delivers request messages for data, and replies to those in response messages containing the requested data. Overall, the wireless data integration engine invokes the PAF to send an array of request messages to the plug-in, via a RequestMessage class. Each of these request messages contains one complete request for data from the plug-in. The RequestMessage class is made up of connection parameters, and InstructionGroup classes which tell the plug-in about instruction clauses—similar to SQL requests—involving specific data fields. Upon completion of each request sent by the RequestMessage class, the plug-in answers with a corresponding response via the ResponseMessage class. When all requests are completed, the plug-in responds by sending an array of response messages back to the plug-in, via the ResponseMessage class. Similar in makeup to the request message, each of these response messages contains one complete response for data from the plug-in. The ResponseMessage class is made up of one or more data tables containing the results of a single request message, any updated connection parameters, and any unhandled InstructionGroup class.

Figure 25:
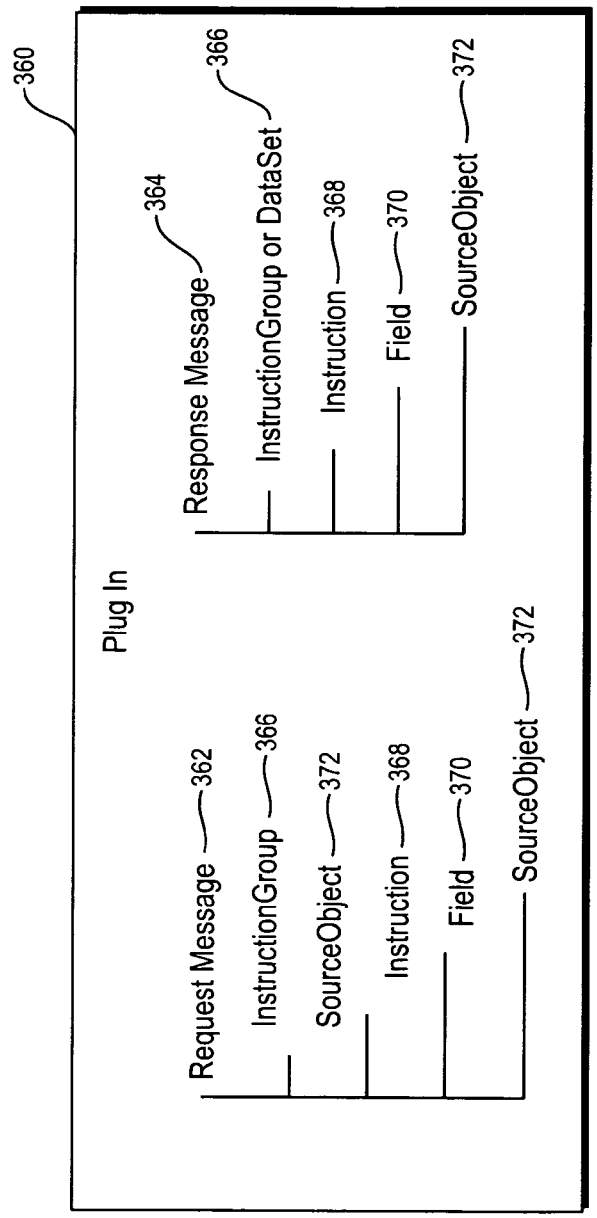
FIG. 25 is a data diagram for the wireless advisor support system data integration network of FIG. 1.

In this embodiment, plug-ins should meet the following three requirements:

1. The plug-in should fully describe the following attributes of its back-end data source:
    all configurable connection parameters to the back-end data source
    all source objects available from the back-end data source
    all required fields of the back-end data source objects
    all required fields returned from the back-end data source objects
2. The plug-in should be able to test its connection to its back-end data source
3. The plug-in should be able to accept requests and return result responses back to the wireless data integration engine, the caller of those requests Referring to FIG. 25, plug-ins utilize required classes, which are arranged hierarchically. Each plug-in uses the defined classes listed in Table 13.

TABLE 13

| | |
|---|---|
| Plug-in 360 | The base class for all plug-ins. All plug-ins inherit from the plug-in class. |
| RequestMessage 362 | This class describes the content called by the wireless data integration engine as a single request and is made up of both connection parameters and a hash table of InstructionGroup classes. |
| ResponseMessage 364 | This class is similar in makeup to the RequestMessage class, and each ResponseMessage contains the following: One DataSet class which might contain one or more DataTable classes, each containing the results of a single RequestMessage Any updated connection parameter Any unhandled InstructionGroup or instruction class |
| InstructionGroup 366 | This class represents one clause of a request, similar to TSQL clauses. In addition, the InstructionGroup contains a list of all instruction classes for that group. The possible clauses or GroupLogic property values for InstructionGroup include the following: select where join order insert update |
| Instruction 368 | Each instruction class must contain the description of a field including the formatting code for the data of that field, and depending on the InstructionGroup clause in which it appears, might also include the following: A criteria for limiting the results of a where or join clause A relationship between two SourceObjects in a join clause. Instruction classes contain one field object that describes the field within the instruction. If the instruction class describes a relationship between two SourceObject classes, a second field object will describe the relating field. |

TABLE 13-continued

| | |
|---|---|
| Field 370 | The field class represents a single field or parameter of the plug-in's data source and contains both of the following:<br>any formatting code for the data of that field<br>a reference to the SourceObject class that contains it |
| SourceObject 372 | The SourceObject class represents an object for the plug-in's back-end data source, including any of the following:<br>A database table, view, or stored procedure<br>A SOAP or web service method<br>An API method call<br>Any other programmatic container for data |

Figure 26:
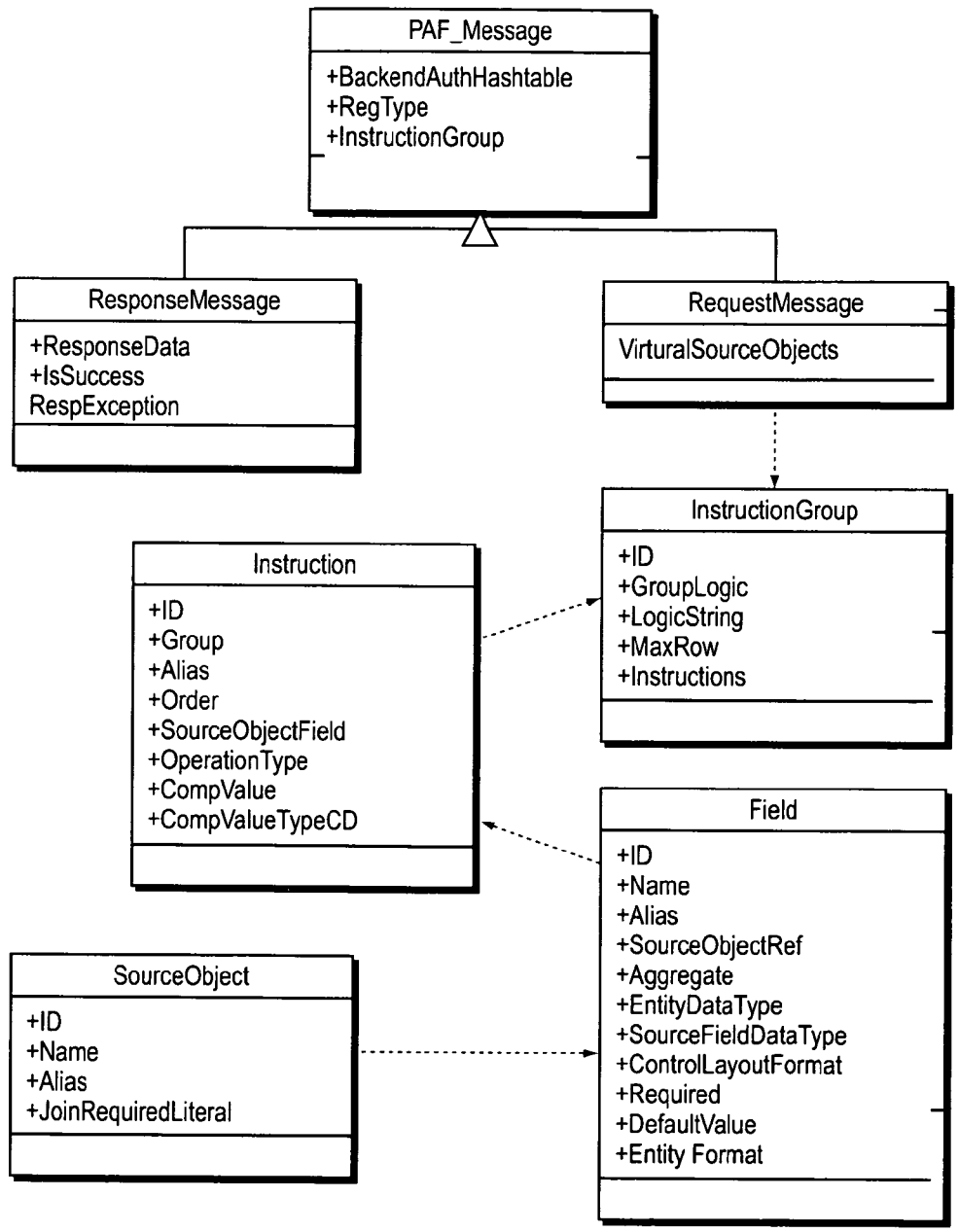
FIG. 26 is a diagram illustrating an example of an overall architecture of classes for plug-ins for the wireless advisor support system data integration network of FIG. 1.

The PAF employs class and property structure that is outlined in the Unified Modeling Language (UML) diagram of FIG. 26.

The job of the plug-in application framework is the parsing of RequestMessage objects sent from the wireless data integration engine to third-party data sources, and, conversely, the populating of ResponseMessage object sent from third-party data sources to the Mobile Data Manager (the wireless data integration engine).

To validate connection parameters for a connection between the wireless data integration engine and the plug-in's data source, the plug-in developer performs the following steps:
1. Ensures that a ValidateAuthParams(Hashtable AuthParams) method has been implemented. This method should ensure that the AuthParams Hashtable object includes all required parameters.
2. Sets the plug-in object's member variable named BackendAuthHashtable to the RequestMessage object's member variable also named BackendAuthHashtable. This will call the ValidateAuthParams method to validate the connection parameters. If the parameters are invalid, the wireless data integration engine throws a plug-inAuthFailure exception.

The DataRequest method receives an array of RequestMessage objects. Each RequestMessage should be handled individually, as each result must be returned in the ResponseMessage array appropriate to its position in the RequestMessage array. Therefore, for each RequestMessage object given to a DataRequest object, the user performs the following steps:
1. Get and validate the BackendAuthHashtable member variable
2. Break out individual InstructionGroup classes for each section of the RequestMessage class accordingly:
   For select, insert, and update InstructionGroup classes, parse each instruction as a field to be returned, inserted, or updated according to requirements listed below.
   For where InstructionGroup classes, parse the criteria to be used in the request, such as input parameters or where clause query instructions, according to requirements for the where instruction group listed below.
   For join InstructionGroup classes, parse each SourceObject class involved by how they relate, and by possible criteria to apply, according to requirements for the join instruction group" listed below.
   For order InstructionGroup classes, order each result according to requirements for the order instruction group listed below.

The developer should employ instructions within the InstructionGroup class appropriately, considering the processes used when sending instructions particular to the data source a plug-in accesses. For example, if the plug-in's data source is SQL server, the user can concatenate the select, join, where, and order BY instructions into a single query to run against the server.

A plug-in preferably should not perform operations that the back-end data source does not have, for example, a plug-in should not perform join operations or specific data formatting if the back-end data source does not. When parsing requests the unhandled instruction should be noted, and when populating responses the plug-in must add the unhandled instruction.

The following specifies requirements of the select, insert, and update InstructionGroup classes. When reading the select InstructionGroup class, the user should parse the following instruction properties and adhere to the following criteria:
1. Each instruction within a select InstructionGroup contains a single field to be returned to the wireless data integration engine.
2. The instruction class contains only a single field object for a single data source field.
3. The CompValueTypeCD value will be set to literal.
4. The SourceObjectField object may contain any of the following properties sent as requests from the wireless data integration engine:

EntityFormat and ControlLayoutFormat property to format data fields

An aggregate property or value for aggregating this field

The EntityDataType property denoting the data type of the field to return in the ResponseMessage The alias property specifying the name to use for the field in the ResponseMessage The SourceObjectRef property containing the SourceObject for the field Any default value to use for null values of the field 5. Any instruction class containing a field in for which the data source cannot apply all the needed formatting should be added to a new InstructionGroup class to be returned in the ResponseMessage InstructionGroups hashtable as an unhandled instruction.
6. When a field is returned in the ResponseData DataSet class within the ResponseMessage class, its DataColumn member should be named according to the field alias property and have the specified EntityDataType data type.
7. The same data source field may be specified more than once in the select InstructionGroup class with different aliases. Each instance of the field should return in the ResponseMessage class with the appropriate alias as the DataColumn member.

When reading the insert InstructionGroup class, the user should parse the following instruction properties and adhere to the following criteria:
1. The insert InstructionGroup will reference one SourceObject class for all its instructions.
2. No other InstructionGroup class will be set for an insert instruction request.
3. Formatting may be present for fields in the insert InstructionGroup class, but aggregation will not.
4. No fields should be returned in the ResponseMessage class. As such, the ResponseData property of the ResponseMessage should be empty.
5. Set the ResponseMessage.IsSuccess Boolean in the ResponseMessage class.

When reading the update InstructionGroup class, the user should parse the following instruction properties and adhere to the following criteria:
1. The update InstructionGroup will reference one SourceObject class for all its instructions.
2. No join InstructionGroup classes will be set for an update instruction request.
3. Where the InstructionGroup class will be set.
4. Formatting may be present for fields in the update InstructionGroup class, but aggregation will not.
5. No fields should be returned in the ResponseMessage class. As such, the ResponseData property of the ResponseMessage should be empty.
6. Set the ResponseMessage.IsSuccess Boolean in the ResponseMessage class.

When reading the where InstructionGroup class, the user should parse the following instruction properties and adhere to the following criteria:
1. Where InstructionGroup classes contain all source objects in a given RequestMessage class.
2. Each instruction in a where InstructionGroup class will contain an alias property that corresponds to its place in the InstructionGroup classes' logic string, named LogicString. The LogicString property contains the AND/OR logic applied to the request to restrict the results.
3. A where instruction class will contain the following:
    a reference to a single field object
    an operation Type comparison operation
    a CompValue value to compare to the field
4. The CompValueTypeCD value will be set to literal.
5. The SourceObjectField object in a where instruction may have all formatting described in the select instruction applied to it.
6. If a data source cannot apply the where instruction or if it does not perform the operation requested in the operationType, the plug-in should do both of the following:
    Add the InstructionGroup class and the instruction to the ResponseMessage classes' InstructionGroup hashtable with the unhandled instruction class set into the as an unhandled InstructionGroup class.
    Ensure that the values for the SourceObjectField object used in instruction return to the caller, either by adding a new instruction referencing the SourceObjectField to the select InstructionGroup, or by some other method.

When reading the join InstructionGroup class, the user should parse the following instruction properties and adhere to the following criteria:
1. Join InstructionGroup classes are used for all cross, inner, or left outer joins.
2. A single join InstructionGroup class describes the relationship between two and only two SourceObject classes.
3. Each instruction class within the join InstructionGroup class contains a single relationship between the two SourceObject classes, or a single condition by which one of the SourceObject classes' results should be limited.
4. Currently, all instruction classes in a join InstructionGroup class will be joined together using an AND function: a rule reinforced by the LogicString class of the InstructionGroup class.
5. Operations performed by an instruction class must either relate the two SourceObject classes involved in the InstructionGroup, or equate a field property in one of the two SourceObject classes in the InstructionGroup class to a constant value or relate one SourceObject class to a DataTable class passed into the plug-in in the RequestMessage.VirtualSourceObjects property. The following details apply to each of these options:
    Rules for relating the two SourceObject classes involved in the InstructionGroup class:
        Two fields will be referenced in the instruction class: SourceObjectField and CompValue
        The CompValueType value will equal field_ref value
        Each field may have source level formatting or aggregation
    Rules for equating the SourceObjectField property in the instruction class from one of the two SourceObject classes to a constant value:
        The SourceObjectField property could be a member of either SourceObject class involved in the join instruction class
        The field class may have source-level formatting or aggregation
        The CompValueTypeCD value will equal literal
    Rules for relating one SourceObject class to a DataTable class passed into the plug-in in the RequestMessage classes' VirtualSourceObjects property:
        The SourceObjectField property in the instruction class will be a member of a SourceObject class in the data source
        The value of CompValue will contain the name of the table and column to use in the relation
        The format of CompValue will be syntactically explicit: {DataTable name}.{DataColumn name}
        The CompValueType will equal datatable
        The DataRow collection within the DataTable class will contain the values to use for relating to the SourceObjectField property in the instruction class
6. If a data source cannot apply the join instruction, or if it does not perform the operationType property requested, the plug-in should:
    Add the instruction class and the InstructionGroup class to the ResponseMessage class InstructionGroup hashtable as an unhandled InstructionGroup class
    Ensure that the values for the SourceObjectField property used in instruction return to the caller, either by adding a new instruction referencing the SourceObjectField to the select InstructionGroup class, or by some other method.

When reading the order InstructionGroup class, the user should parse the following instruction properties and adhere to the following criteria:
1. Each instruction within a order InstructionGroup contains a single field by which the results should be ordered.
2. The instruction class contains only a single field object for a single data source field.

3. The instruction class contains an Order property. This property contains the zero-based offset for the position of the field in the order InstructionGroup class.
4. The CompValueTypeCD class value will be set to literal.
5. The SourceObjectField object may contain any of the following properties sent as requests from the wireless data integration engine:

EntityFormat and ControlLayoutFormat properties to format data fields

An Aggregate property or value for aggregating this field

The SourceObjectRef property containing the SourceObject for the field

Any default value to use for null values of the field.

6. Any instruction class containing a field for which the data source cannot apply all the needed formatting should be added to a new InstructionGroup class to be returned in the ResponseMessage InstructionGroups hashtable as an unhandled instruction.
7. The same data source field may be specified more than once in the order InstructionGroup class with different aliases.

Populating the ResponseMessage Object

The ResponseMessage class contains information to be returned from the plug-in to the wireless data integration engine, the calling application. It communicates the result of a request to the wireless data integration engine, and includes any updated authentication properties, unhandled requests, or exceptions. This section clarifies the key members of a ResponseMessage object and provides guidelines for writing a successful ResponseMessage object. It should be noted that each ResponseMessage in the ResponseMessage array will correspond to a RequestMessage in the RequestMessage array. The following specifies the key members included in the ResponseMessage class:

A IsSuccess Boolean indicating if the request succeeds

Any results from the request in the ResponseData property

Any updated or changed authentication parameters in the BackendAuthHashtable property Any unhandled instruction or InstructionGroups classes in the InstructionGroups hashtable Any exception in the RespException property that was encountered during the request.

In order to write a successful ResponseMessage object, the use should populate the following instruction properties and adhere to the following criteria:

Set the IsSuccess property to true.

If the RequestType was select, do the following:

a. Populate the ResponseData classes' DataSet class with the results, so that each DataTable class in the DataSet class is named according to the SourceObject class results that it contains, specifically:

The DataTable class name consists of the SourceObject ID property wrapped in brackets([,])

If multiple SourceObjects are involved in the result, as is the case of a join having been performed, all SourceObject IDs should be included, each wrapped in brackets and delimited by a comma The plug-in.StringBuilder( ) method has been created to aid in creating the final DataTable name b. Populate the ResponseData property with the results, so that if the data source does not perform joins and join InstructionGroup classes were present in the ReqestMessage class, multiple DataTable classes should be present in the ResponseData property. Specifically, each DataTable class should be named with the bracketed ID of the SourceObject class involved in populating the DataTable class.

c. Populate the ResponseData property with the results, so that the DataColumns in the DataTable are named after the Field.Alias property, and have the Field.EntityDataType data type, for the field associated with that DataColumn. Note that the same data source field may have multiple field objects requested in the select InstructionGroup class, but each field object requested must be returned as its own.

If the RequestType was insert, update, or delete, no ResponseData object result is needed.

If the request is unsuccessful, the ResponseMessage object populates according to the following criteria:

1. Set the IsSuccess property to false.
2. Add any exception encountered during the request to the RespException.

Lastly, when coding a custom plug-in, the user will need to integrate the PAF with the platform administration tool 42 to enable testing the connection to third-party data specific to the plug-in, as well as to configure that data for wireless application screens. To test the connection to the third-party data specific to the plug-in, the PAF should describe particular connection parameters.

In order for the plug-in to correctly interact with the wireless data integration engine, the user should override and implement a number of plug-in class methods. To integrate the PAF with the administration tool, the user should set the following class methods to describe and contain properties as specified for each.

1. Set the DescribeParams( ) class to perform the following:

Describe the required and optional parameters to a plug-in

Return an array of ConnParam objects, each ConnParam object described by the following:

Its name (ConnParam.Name)

Its value (ConnParam.Value)

Its order in the list (ConnParam.ParamOrder)

Is the parameter required (ConnParam.Required)

Is the parameter hidden, i.e. should it be displayed in MPAC or on the client (ConnParam.IsHidden)

A short description of the parameter (ConnParam.ShortDesc)

2. Set the DescribeObjects( ) class to perform the following:

Describe all the SourceObjects available within a data source

Return an ArrayList of SourceObjects, each SourceObject is any method, table, view, stored procedure, or access point available in the data source for the given credentials and should have ID, Name, and JoinRequireLiterals properties set.

3. Set the DescribeFields( ) class to perform the following:

Describe all the fields available for a particular SourceObject in a data source Return an ArrayList of field objects, each having the following properties set:

ID
Name
Alias
SourceFieldDataType
SourceObjectRef
Required

4. Test the connection to the data source after the required parameters have been set using TestConnection( ) class, assuring the following result:

The result should return true if the connection succeeds, false otherwise

The result should close the connection after completing the test

The result should not return an exception, except in critical events.

The data integration server provides a central data repository that contains the description of all system settings, parameters, and configuration data required for the operation of the system. The data repository can store these settings as meta-data, which can be used at runtime by the system server to identify required data sources, connect to those sources, authenticate with those sources, and retrieve and format data responses from those sources. These meta-data are also used at runtime to configure the application user interface, screen definition, screen layout, inter-screen navigation, field validation, and other related application behaviors.

Figure 27:
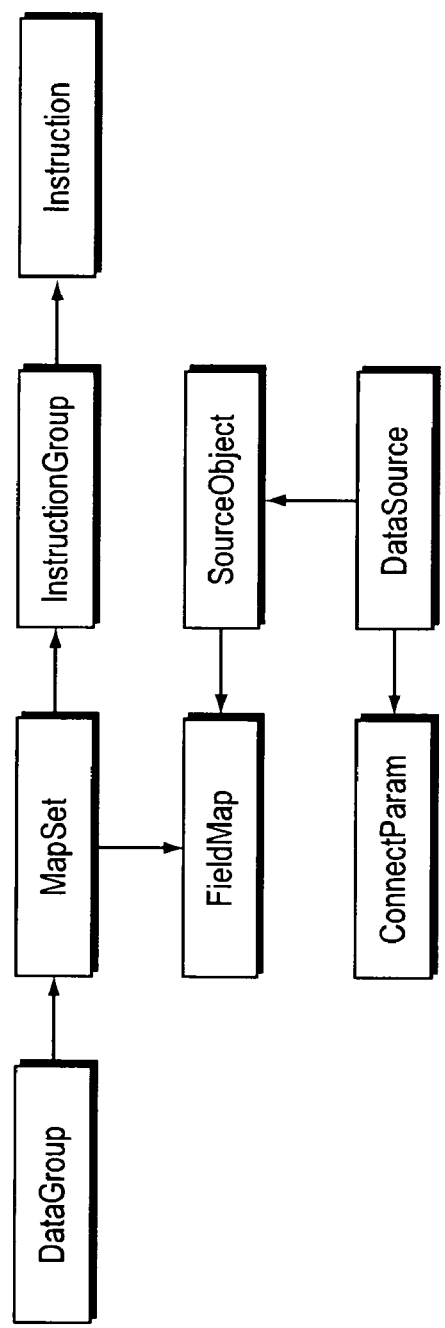
FIG. 27 is an entity relationship diagram for the wireless advisor support system data integration network of FIG. 1.
Figure 28:
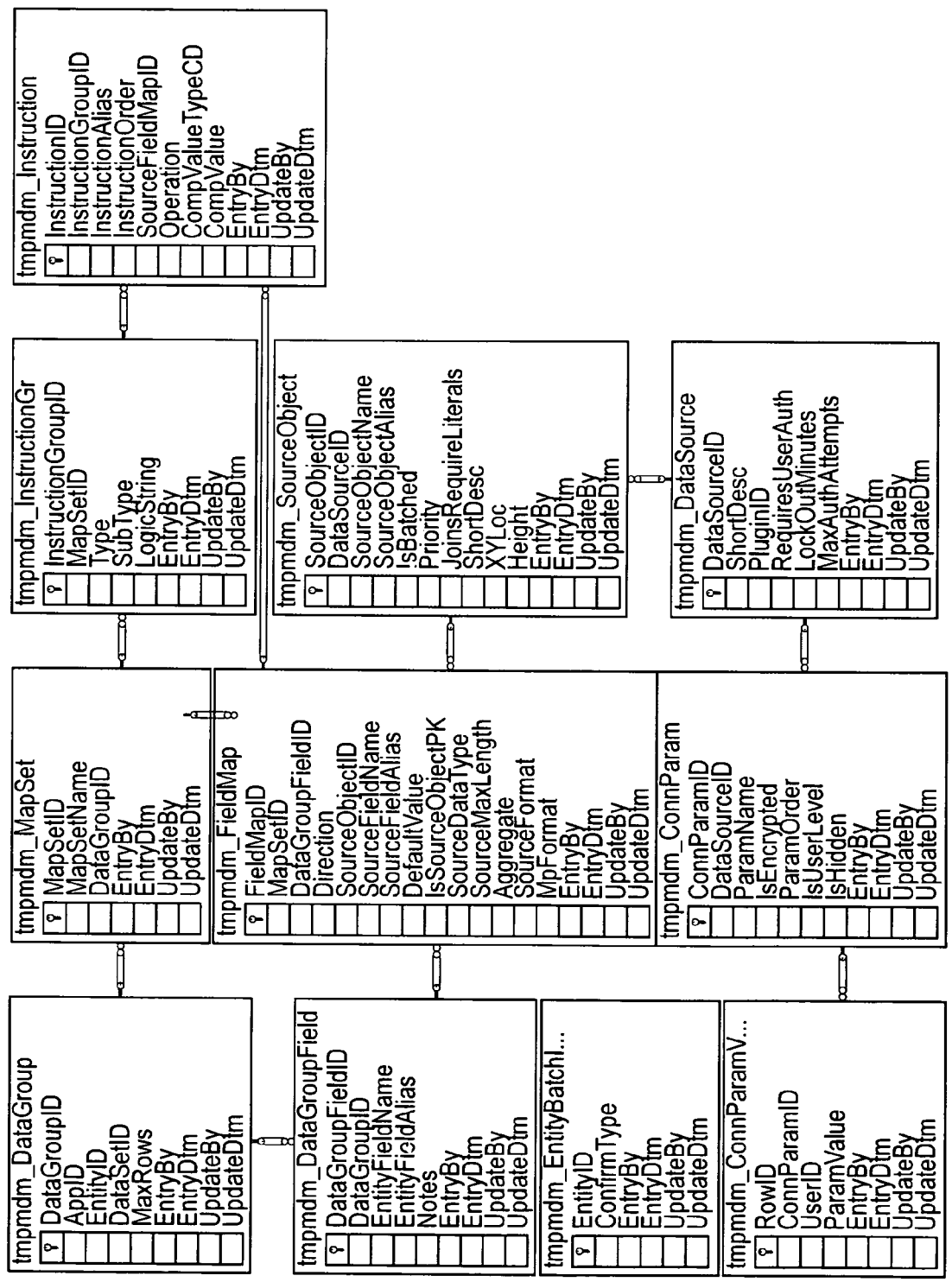
FIG. 28 is a database diagram for the data integration server used in the wireless advisor support system data integration network of FIG. 1.
Figure 29:
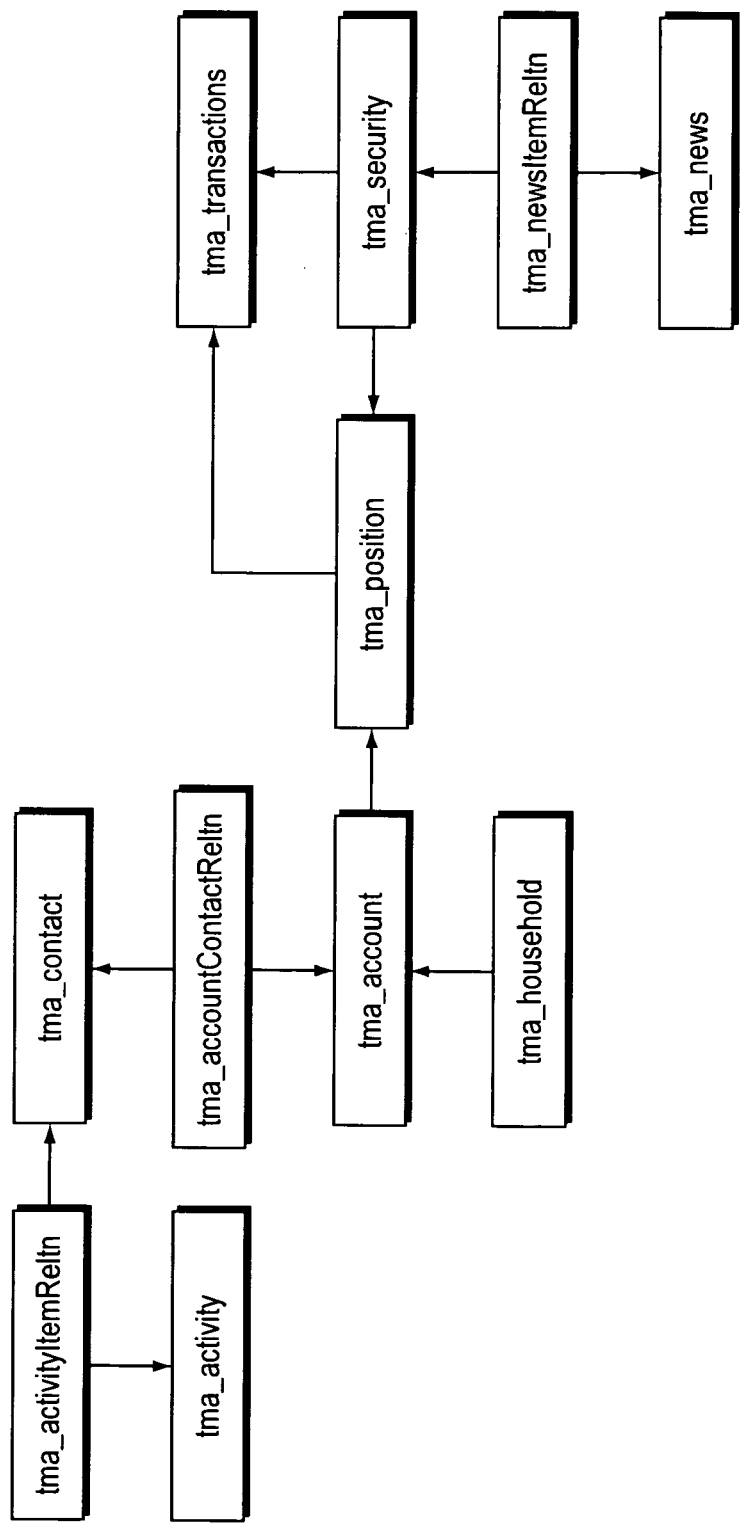
FIG. 29 is a UML diagram of PAF classes and methods for the wireless advisor support system data integration network of FIG. 1.

The overall data model used by the data integration server 22 is presented in FIG. 27, and a more detailed model is presented in FIG. 28. The data model used for the user interface screens is presented in FIG. 29. An arrow in these diagrams indicates that an entity at the tail of the arrow can accommodate more than one of the entities at its head. These models have been found to provide good support for the illustrative implementation, but one of ordinary skill in the art would of course be able to adjust them in a variety of ways to suit particular requirements.

The architecture described above is very versatile. Plug-ins can readily be created to accommodate virtually any data source through any type of interface. More common interfaces include Simple Object Access Protocol (SOAP) interfaces, Component Object Model (COM) interfaces, Enterprise Java Beans (EJB) interfaces, and hypertext transfer protocol (HTTP) interfaces. The definition of and parameters for these common interfaces are specified and maintained in a central database repository, but others could also be accommodated.

OPERATIONAL EXAMPLE

In the following example a system administrator uses the wireless advisor support system 10 to create instructions for a contact list view. This example is based on gathering a financial advisor's data from three separate data sources.

Using the user interface of the administration tool 42, a system administrator configures data sources and data fields to associate to a screen, creating data integration engine instructions in the process. After choosing the data sources and data fields, the system administrator adds to the instructions defined by configuring how to join data across data sources. Finally the system administrator adds instructions to create a calculated column and a data driven formatting rule on columns that come from two different data sources.

The wireless data integration engine 28 can be accessed for configuring through a configuration node of the administration tool 42. It provides tools to connect to, join, format, filter, map, order, and aggregate data from diverse enterprise and third-party data sources with wireless data integration server data entities for display on the handheld screens of wireless data integration server applications. It offers the option to connect multiple enterprises and third-party data sources including real-time feeds, and sources beyond CRM data, to wireless data integration server data and provides tools for joining, mapping and ordering those distinct data fields within wireless data integration server data.

After the system administrator has configured instructions for wireless application views, the financial advisor is ready to use the wireless application 20 on a mobile computer. The financial advisor navigates to the contact list screen, for example, and the wireless application sends a corresponding request to the web services interface 26 through a mobile data network. The web services interface forwards the request on to the wireless data integration engine 28.

The wireless data integration engine 28 receives the request from the web services interface 26 and processes it. First, it gathers all of the instructions that the administration tool had previously configured for the contact list screen. Next, it splits the set instructions and sends a subset of them to the plug-in for each data source.

In this example there are three plug-ins. Each connects to a different data source and receives a different subset of the instructions required to complete the contact list screen request. A CRM Plug-in 210 connects to a CRM data source 32. An account system plug-in 34 connects to an account system data source 36. And a market price plug-in 38 connects to a market data source 40. The following descriptions of how the plug-ins work apply to each of the three plug-ins in this example.

The plug-in for each data source operates on its subset of instructions. Each plug-in first sets aside instructions that its associated data source cannot perform. Next the plug-in translates the remaining instructions into data-source-specific commands. The plug-in then runs the data source-specific commands against the data source and obtains data and response codes, and translates data and response codes into a format understood by the wireless data integration engine 28. Finally, the plug-in responds to the wireless data integration engine with data, response codes, and instructions that it did not perform.

When the wireless data integration engine 28 receives responses from all plug-ins, it runs the instructions that each plug-in could not run. It joins the many separate data results returned from multiple plug-ins together into a single data table. With a single data table containing all of the requested data from multiple sources, the wireless data integration engine is now ready to apply calculated columns and data driven formatting, or DDF.

The wireless data integration engine 28 adds calculated columns to the data table by applying a mathematical or string expression to two or more columns already in the data table. During DDF processing, it calculates a display format for each data point in a data column based on the value of that data point and other data points in the same row of the data table. The wireless data integration engine then encodes the format in a manner in which the wireless application 20 can interpret and display it. The result of the DDF process is that each row of data displayed on a wireless application screen can have different formatting.

After DDF processing, the wireless data integration engine 28 has completed its processing and it sends a response back to the web services interface 26 containing a single data table with data from multiple data sources. The web services interface then formats the response and sends it to an instance of the wireless application over a mobile data network.

The wireless application 20 receives the response from the web services interface 26 and displays the client list screen (See FIG. 5) to the financial advisor, applying colors and special characters where specified by encoded DDF data. The financial advisor views the end result as a single screen of data within the wireless application displaying data from multiple data sources with calculated columns and data driven formatting applied.

The illustrative embodiment described in this application is implemented as a series of programs that use the Microsoft .NET Framework and Java Micro Edition (JME) and are designed to operate in cooperation with networked Microsoft Windows®-based computers. But other software platforms could of course also be supported, such as web-based platforms, and some or all of the system could even be implemented using dedicated hardware.

The illustrative embodiment is also designed to be administered, customized, and used by different classes of users. This allows an efficient allocation of skills to different problems in a medium to large size organization. But it is also possible to provide implementations that operate in such a way as to employ more, fewer, or different classes of users. And even in the case of the illustrative embodiment, a single user can assume more than one operational role.

The functionality and user interface described are intended to illustrate features and functions of the invention. But one of ordinary skill in the art would recognize that there may be other possible ways to various aspects of the claimed invention. To this end, the functions and controls shown could be modified, swapped, merged, split up, or combined in ways not shown. Other types of controls could also implement claimed functionality, and some of the controls may even be omitted without departing from the spirit and scope of the invention.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto. In addition, the order of presentation of the claims should not be construed to limit the scope of any particular term in the claims.

What is claimed is:

1. A computer-based financial advisor support method implemented with at least some executable instructions stored in a wireless handheld device, comprising:

presenting on the wireless handheld device a list of household entities, receiving through a user interface of the wireless handheld device household entity selection commands for a selected household entity in the list of household entities presented in the step of presenting a list of household entities, presenting on a wireless handheld device a list of accounts of different types held by the selected household entity at different institutions, wherein the accounts include investment accounts that hold one or more investment instruments, receiving through a user interface of the wireless handheld device account selection commands for a selected account in the list presented in the step of presenting, and presenting on the wireless handheld device account information for the selected account in response to the step of receiving, wherein the account information is received wirelessly by the wireless handheld device from a server.

2. The method of claim 1 wherein the step of presenting a list of accounts presents a list that includes account information from the different types of accounts.

3. The method of claim 2 wherein the account information presented in the step of presenting a list of accounts is presented in real-time.

4. The method of claim 1 wherein the account information presented in the step of presenting account information is presented in real-time.

5. The method of claim 1 wherein at least some of the accounts are personal accounts held by a member of the household entity and some of the accounts are fiduciary accounts held for the household entity by third parties.

6. The method of claim 1 wherein at least some of the accounts belong to different members of the household.

7. The method of claim 1 further including the steps of:

presenting on a wireless handheld device a list of household entities, receiving through the wireless handheld device household entity selection commands for a selected household entity in the list of household entities presented in the step of presenting a list of household entities, and wherein the step of presenting a list of accounts presents a list of accounts for the selected household entity.

8. The system of claim 1 wherein members of the household are linked by civil family relationships.

* * * * *